(12) United States Patent
Moores, Jr. et al.

(10) Patent No.: US 6,261,035 B1
(45) Date of Patent: Jul. 17, 2001

(54) CHUCK, BIT, ASSEMBLY THEREOF AND METHODS OF MOUNTING

(75) Inventors: Robert G. Moores, Jr., Reisterstown; Allen Brelsford, Baldwin; John R. Cochran, Baltimore, all of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/439,505

(22) Filed: Nov. 12, 1999

Related U.S. Application Data

(60) Provisional application No. 60/108,336, filed on Nov. 13, 1998, and provisional application No. 60/108,107, filed on Nov. 12, 1998.

(51) Int. Cl.[7] .......................... B23B 31/107; B23B 51/00
(52) U.S. Cl. .......................... 408/239 R; 279/24; 279/29; 279/82; 279/137; 279/904; 279/906; 408/226
(58) Field of Search ........................ 279/14, 19.4, 19.5, 279/22, 27.1, 76, 82, 75, 137, 904, 905, 906, 24, 29; 408/226, 239 R, 240

(56) References Cited

U.S. PATENT DOCUMENTS

| | | |
|---|---|---|
| Re. 35,174 | 3/1996 | Wanner . |
| 751,345 | 2/1904 | Saunders . |
| 1,138,465 | 5/1915 | Fegley et al. . |
| 1,679,175 | 7/1928 | Schneider et al. . |
| 1,862,623 * | 6/1932 | Harrington ............................. 279/76 |
| 2,138,253 * | 11/1938 | Lynch ..................................... 279/76 |
| 2,270,840 * | 1/1942 | Allen ..................................... 279/76 |
| 2,395,534 | 2/1946 | Cook . |
| 2,878,701 | 3/1959 | Weersma . |
| 3,156,479 * | 11/1964 | Drazick .................................. 279/76 |
| 3,251,605 | 5/1966 | Ondeck . |
| 4,107,949 | 8/1978 | Wanner et al. . |
| 4,111,592 | 9/1978 | Schnitzler et al. . |
| 4,131,165 | 12/1978 | Wanner et al. . |
| 4,629,375 * | 12/1986 | Lieser ................................ 408/239 R |
| 4,655,651 * | 4/1987 | Hunger et al. ....................... 408/226 |
| 4,690,226 | 9/1987 | Schnizler et al. . |
| 4,692,073 | 9/1987 | Martindell . |
| 4,702,651 * | 10/1987 | Kleine ................................. 408/226 |

(List continued on next page.)

FOREIGN PATENT DOCUMENTS

| | | | |
|---|---|---|---|
| 3419465 * | 11/1985 | (DE) | ................................. 279/19.4 |
| 19539414 | 10/1995 | (DE) . | |
| 19604284 | 8/1997 | (DE) . | |
| 456003 * | 11/1991 | (EP) | ................................. 408/226 |
| 0762948 | 12/1995 | (EP) . | |
| 2281244 | 3/1995 | (GB) . | |
| 2286351 | 8/1995 | (GB) . | |
| 2290043 | 12/1995 | (GB) . | |
| 74510 * | 4/1987 | (JP) | ................................. 279/19.3 |

Primary Examiner—Steven C. Bishop
(74) Attorney, Agent, or Firm—Charles E. Yocum; John D. Del Ponti; Bruce S. Shapiro

(57) ABSTRACT

A chuck 40 includes a body 42 having a plurality of angularly spaced ribs 166, 168 and 170 formed in a forward cylindrical opening 48 thereof. A locking element 236 is movable within a passage 180 of the body 42, and is formed with a defined portion 242 which is extendable from the passage 180, through an inboard peak surface 172 of the rib 166 and into the opening 48. An actuator 44 is coupled to the locking element 236 and is biased by a spring 250 to urge normally the defined portion 242 of the locking element into the opening 48. A bit 62 is formed with a shank 96 with three grooves 100, 102 and 104 extending axially to a free end 112 thereof. A pocket 114 is formed in a base of each of the grooves 100, 102 and 104. The bit 62 can be manually inserted into the opening 48 of the chuck 40 such that the grooves 100, 102 and 104 are located drivingly over at least portions of the ribs 166, 168 and 170, respectively. In addition, the defined portion 242 of the locking element 236 is located biasingly within the pocket 114 to lock the bit 62 with the chuck 40.

90 Claims, 13 Drawing Sheets

U.S. PATENT DOCUMENTS

| | | |
|---|---|---|
| 4,840,519 | 6/1989 | Kleine . |
| 4,900,202 | 2/1990 | Weinhold . |
| 4,943,192 * | 7/1990 | Lafforgue et al. .................. 408/226 |
| 5,016,892 * | 5/1991 | Lafforgue et al. .................... 279/82 |
| 5,054,973 * | 10/1991 | Knoller et al. ....................... 408/226 |
| 5,174,698 | 12/1992 | Obermeier . |
| 5,326,199 | 7/1994 | Kleine et al. . |
| 5,340,245 * | 8/1994 | Bloechle et al. .................... 408/226 |
| 5,397,203 * | 3/1995 | Kleine et al. ........................ 408/226 |
| 5,398,946 * | 3/1995 | Quiring ................................. 279/75 |
| 5,470,084 * | 11/1995 | Reibetanz et al. ................... 279/137 |
| 5,505,570 | 4/1996 | Meyen . |
| 5,518,345 * | 5/1996 | Obermeier ........................... 408/226 |
| 5,558,478 * | 9/1996 | Odendahl et al. ................... 408/226 |
| 5,704,744 | 1/1998 | Kleine et al. . |
| 5,833,405 | 11/1998 | Nielsen . |

\* cited by examiner

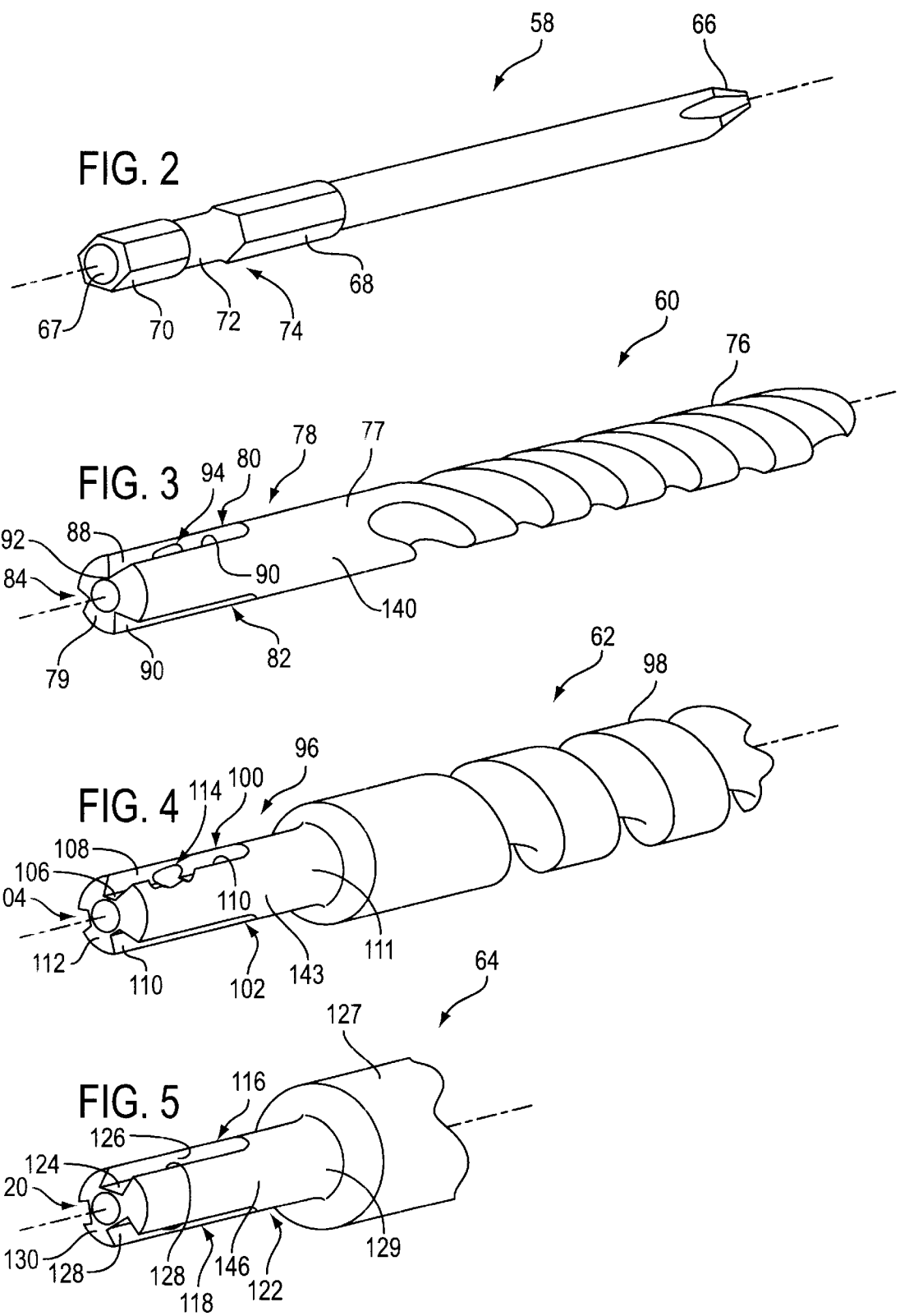

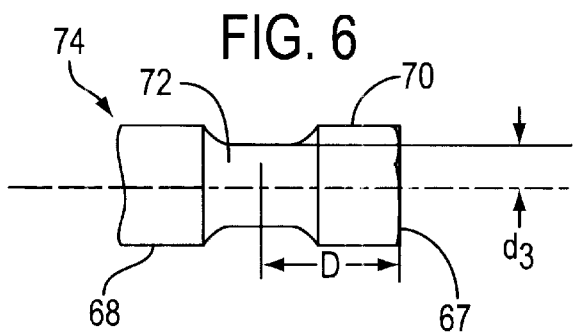
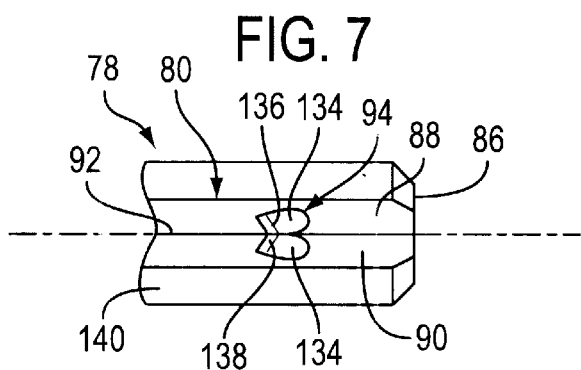
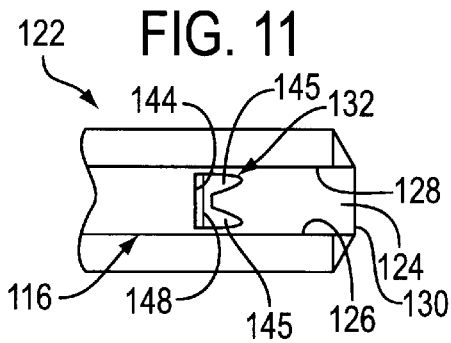
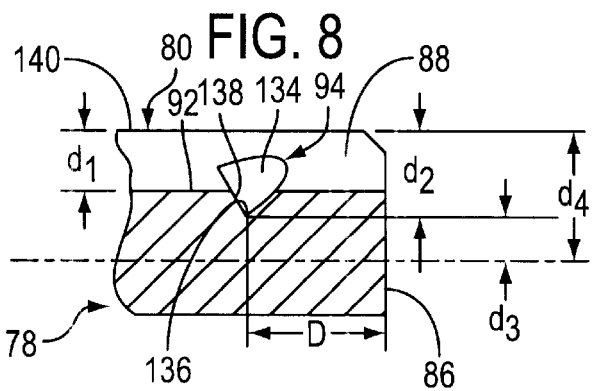
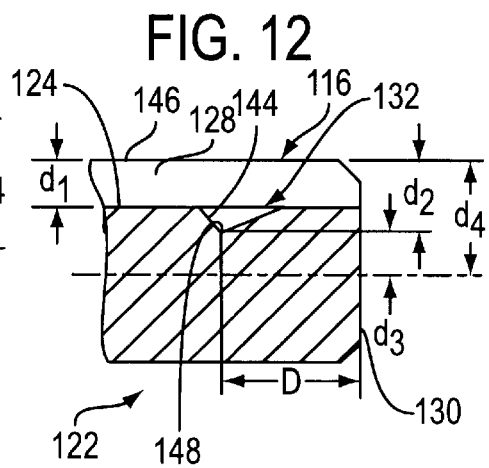
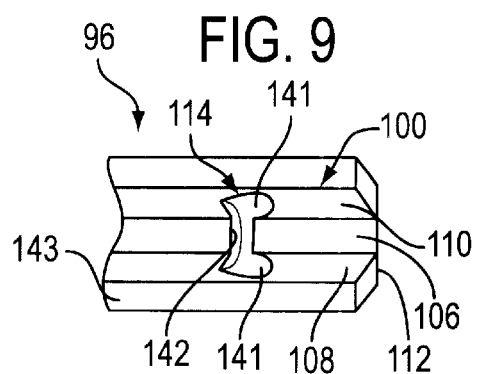

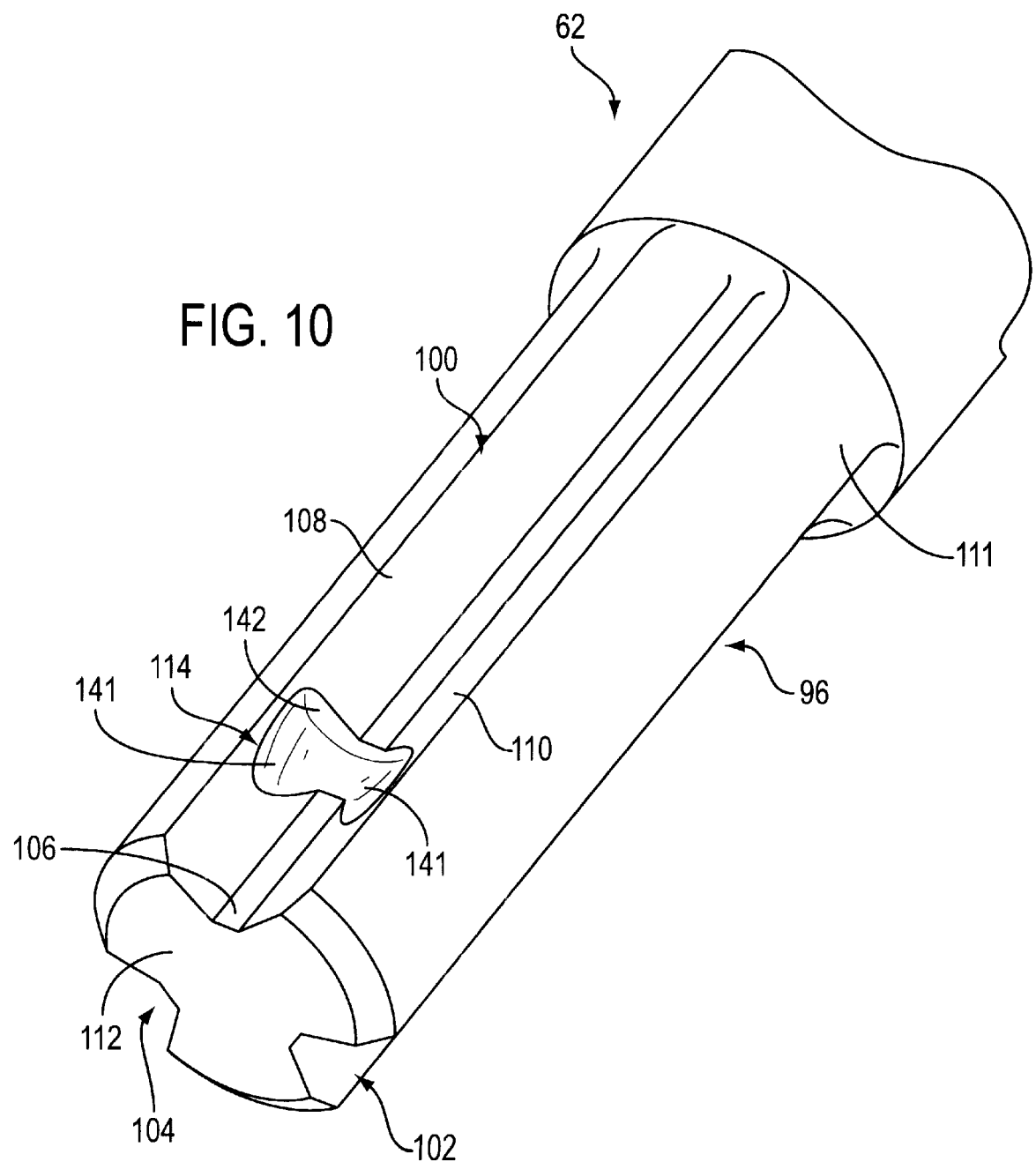

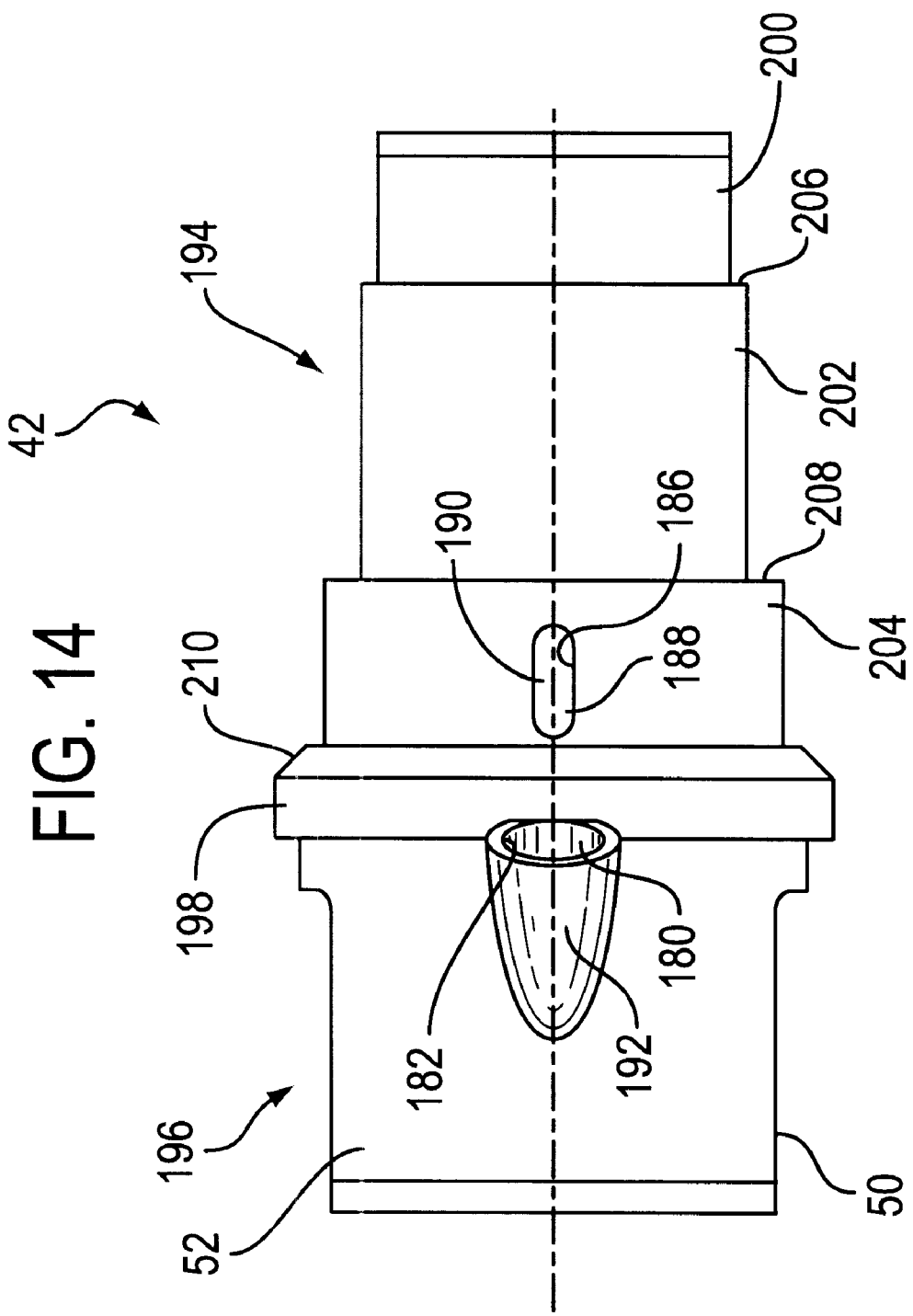

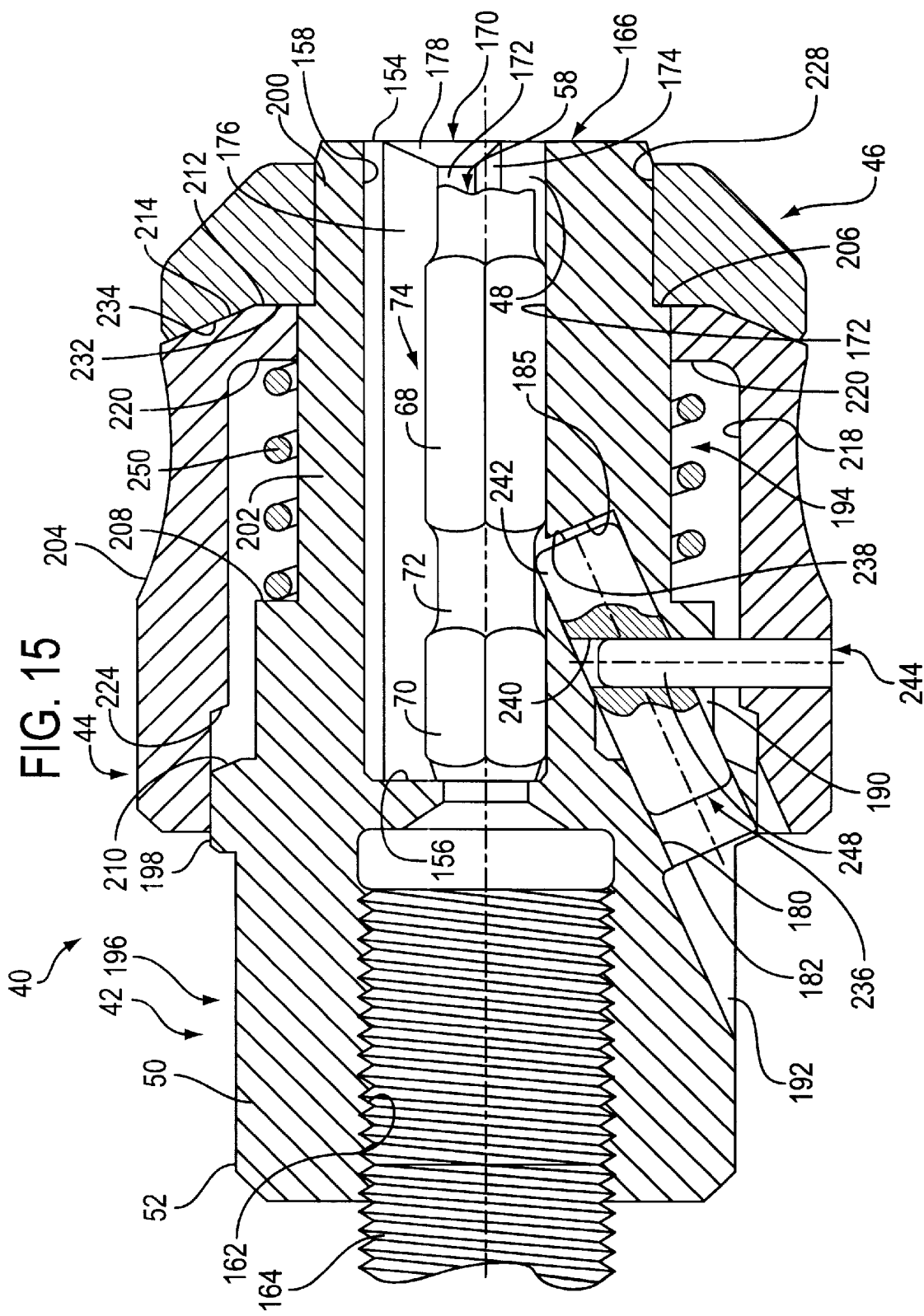

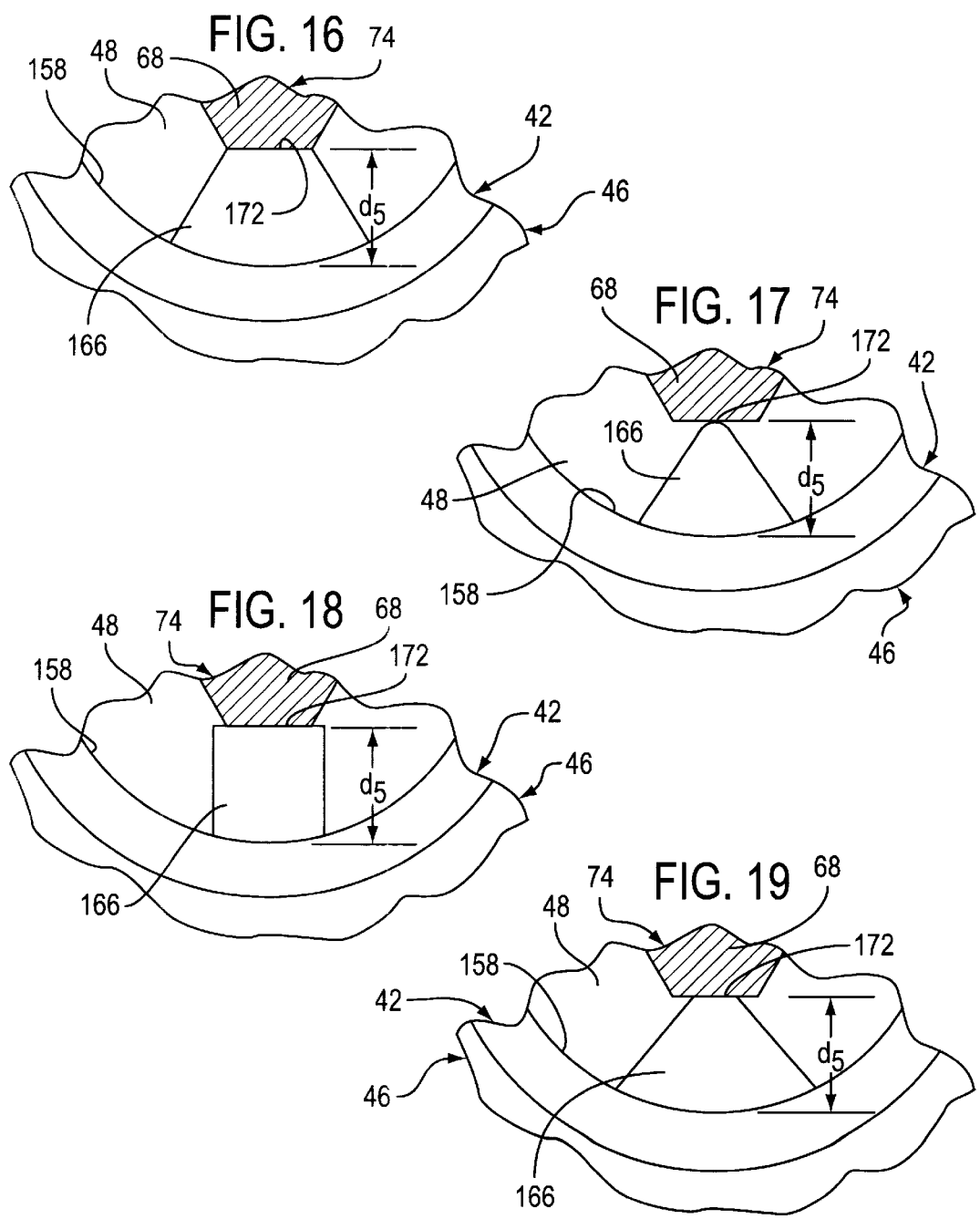

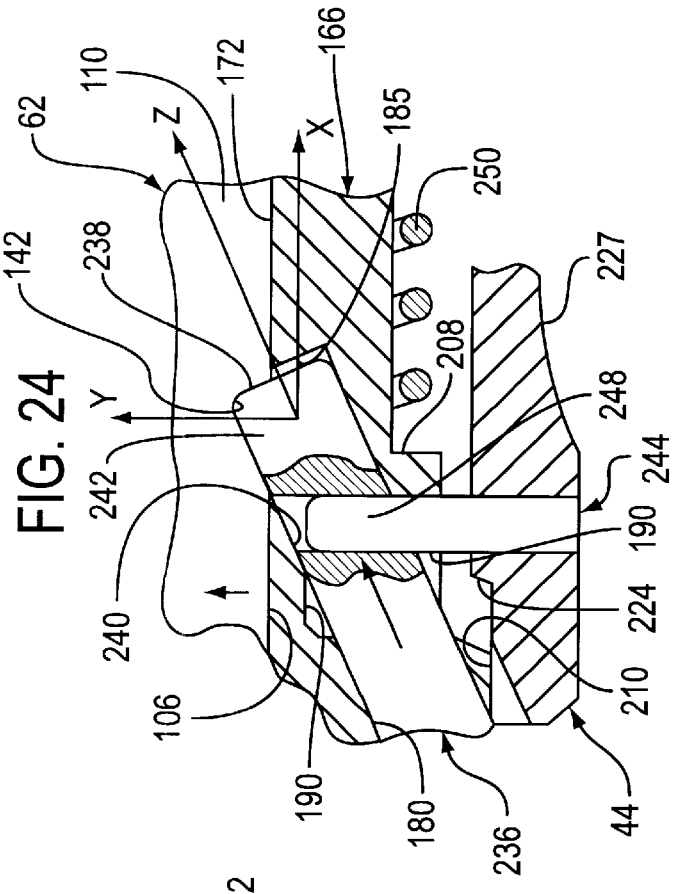

CHUCK, BIT, ASSEMBLY THEREOF AND METHODS OF MOUNTING

This appln claims the benefit of Provisional Nos. 60/108,107 filed Nov. 12, 1998 and 60/108,336 filed Nov. 13, 1998.

BACKGROUND OF THE INVENTION

This invention relates to a chuck, a bit, an assembly thereof, and methods of mounting the bit in the chuck. In particular, this invention relates to the structure of the chuck, the structure of the bit, the interrelated structure of the assembled chuck and bit, methods of mounting the bit in the chuck.

For many years, chucks have been used to grip or mount bits for a variety of purposes, including the mounting of rotary bits for use with a hand or power tool. In many instances, chucks have included a plurality of movable bit-engaging jaws mounted within an opening of a chuck body. The jaws can be manipulated to clamp the shank of a bit which has been inserted into the opening of the chuck. In this manner, the bit is retained with the chuck which, in turn, is mounted on the hand or power tool. The jaws of such chucks may be operated by use of an external implement, such as a conventional chuck key, or by rotational elements on the chuck.

Other chucks of the past were designed to allow the bit to be inserted directly into the opening of the chuck using a direct-insertion mounting technique, whereby the bit is locked in assembly with the chuck by virtue of structure within a body of the chuck and on the bit.

While some of the above-noted chucks are adapted to receive and mount bits by insertion of the bits directly into the bit-receiving opening of the chuck, the opening is typically designed to receive only shanks of bits with a common diameter or size, consistent with the diameter or size of the opening. Thus, a set of bits of different diameters at the working ends thereof would each be required to have a chuck-mounting shank diameter which is the same as the shank diameter of the remaining bits of the set. This leads to a situation where the bit shank, in order to be strong enough to handle the forces and torques imposed on the larger bits of a range of sizes employed, is much larger than needed, and thus uneconomical, for the smallest bits of the set.

Thus, there is a need for a chuck having structure which will facilitate use of the direct-insertion mounting technique for bits having different shank diameters.

Also, with respect to bits which are formed with chuck-mounting shanks of different diameters, there is a need for uniform structure on such shanks to facilitate assembly of each bit with common structure of the chuck when using a direct-insertion mounting technique.

In addition, there is a need for a chuck and bit assembly having structure which facilitates use of the direct-insertion mounting technique where the parameters of the chuck structure are constant and the parameters of the structure of the bits fluctuates.

SUMMARY OF THE INVENTION

It is, therefore, an object of this invention to provide a chuck having consistent structure which will facilitate use of a direct-insertion mounting technique for bits having different chuck-mounting shank diameters.

Another object of this invention is to provide bits having a uniform structure on chuck-mounting shanks of different diameters to facilitate assembly of each bit with consistent structure of a chuck when using a direct-insertion mounting technique.

Still another object of this invention is to provide a chuck and bit assembly, each having structure which facilitates use of a direct-insertion mounting technique where parameters of the structure of the chuck are constant and parameters of the structure of the bits fluctuates.

With these and other objects in mind, this invention contemplates a chuck for receiving and supporting a bit, and includes a body having an opening therein formed along an axis thereof for receipt of the bit. The opening of the body is formed with a wall having at least a portion thereof which is spaced from the axis of the body by a prescribed distance. A locking element is mounted for movement relative to the body for locking the bit within the opening of the body. The locking element has at least a defined portion thereof which is normally extendable from the wall into the opening of the body to a location within the opening generally intermediate the prescribed distance.

This invention further contemplates a bit for assembly with a chuck having a locking element, and includes a chuck-mountable shank formed along an axis thereof. The shank is formed with a forward end and a trailing end, and at least one groove is formed in the shank between the forward and trailing ends of the shank and through the trailing end. The groove is formed with a base, and a pocket is formed in at least a portion of the base of the groove at a prescribed radial distance from the axis of the shank for receipt of the locking element of the chuck.

In another aspect, this invention contemplates a bit for assembly with a chuck having a locking element, and includes a chuck-mountable shank formed along an axis thereof. The shank is formed with a forward end and a trailing end, and at least one groove is formed in the shank between the forward and trailing ends of the shank and through the trailing end. The groove is formed with a base, and a pocket is formed in at least a portion of the base of the groove at a prescribed axial distance from the trailing end of the shank for receipt of the locking element of the chuck.

Still further, the invention contemplates a set of bits for assembly with a chuck having a locking element wherein each bit of the set is formed with a chuck-mountable shank having an axis and an external transaxial dimension which is different from the external transaxial dimension of any of the other bits of the set. The shank of each bit of the set is formed with a forward end and a trailing end, and at least one groove is formed in the shank of each bit of the set between the forward and trailing ends of the shank and through the trailing end. The groove of each bit of the set is formed with a base. A pocket is formed in at least a portion of the base of the groove of each bit of the set at a prescribed radial distance from the axis of the shank for receipt of the locking element of the chuck. The prescribed radial distances of the bits of the set are the same.

This invention also contemplates an assembly which includes a chuck and a bit mounted in the chuck, where the chuck includes a body having an opening therein formed along an axis thereof for receipt of the bit. The opening is formed with a wall having at least a portion thereof which is spaced from the axis of the body by a prescribed wall distance. At least one protrusion having a prescribed height is formed on the wall of the opening and extends toward the axis of the body to an inboard peak surface of the protrusion. A locking element is mounted for movement relative to the body for locking the bit within the opening of the body. The locking element has at least a defined portion thereof which is normally extendable from the inboard peak surface of the protrusion into the opening of the body to a locking location within the opening generally intermediate the prescribed wall distance. The bit includes a chuck-mountable shank formed along an axis thereof. A pocket is formed in at least a portion of an outwardly facing surface of the shank at a prescribed radial distance from the axis of the shank. The bit is in assembly within the opening of the body of the chuck, wherein the axis of the shank is coincidental with the axis of the body of the chuck, the pocket is adjacent the inboard peak surface of the protrusion and is positioned at the locking location, and the defined portion of the locking element of the chuck is located within the pocket of the bit to thereby lock the bit with the chuck.

This invention further contemplates a method of mounting alternatively bits of a set in a chuck, including the steps of providing a set of bits wherein each bit is formed with a shank having a free end, a shank axis and a transaxial dimension. The shank of a first bit in the set has a different transaxial dimension from the shank of a second bit in the set. A groove is formed in the shank of the first bit in the set and extends through the free end. A pocket is formed in the groove of the first bit shank at a prescribed radial distance from the axis of the shank. Additionally, the method includes providing a chuck comprising a body having an opening for alternatively receiving the shanks of the bits in the set, with the opening defining an axis of the chuck. The method further includes the steps of inserting alternately the first bit shank and the second bit shank in the chuck opening, drivingly engaging in the groove of the first bit a rib of the chuck, with the rib projecting a predetermined distance toward the chuck axis; and drivingly engaging a surface of the second bit and the rib of the chuck, the rib projecting the same predetermined distance toward the chuck axis when the first and second bits are alternatively inserted in the chuck.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 is a perspective view showing a first bit having a chuck-mountable shank in a hex configuration and formed with an annular groove;

FIG. 3 is a perspective view showing a second bit having structure formed in a chuck-mountable shank thereof in accordance with certain principles of the invention;

FIG. 4 is a perspective view showing partially a third bit having structure formed in a chuck-mountable shank thereof in accordance with certain principles of the invention;

FIG. 5 is a perspective view showing partially a fourth bit having structure formed in a chuck-mountable shank thereof in accordance with certain principles of the invention;

FIG. 6 is a partial side view of the first bit of FIG. 2 showing dimensional parameters of the shank of the bit in accordance with certain principles of the invention;

FIG. 7 is a partial plan view showing the second bit of FIG. 3 with a pocket formed in a groove of the shank of the bit in accordance with certain principles of the invention;

FIG. 8 is a sectional view showing the pocket within the groove of the bit of FIG. 7, and dimensional parameters thereof, in accordance with certain principles of the invention;

FIG. 9 is a partial plan view showing the third bit of FIG. 4 with a pocket formed in a groove of the shank of the bit in accordance with certain principles of the invention;

FIG. 10 is a perspective view showing the shank of the bit of FIG. 9 with the pocket formed in the base of the groove in accordance with certain principles of the invention;

FIG. 11 is a partial plan view showing the fourth bit of FIG. 5 with a pocket formed in a groove of the shank of the bit in accordance with certain principles of the invention;

FIG. 12 is a sectional view showing the pocket within the groove of the bits of FIGS. 9 and 11, and dimensional parameters thereof, in accordance with certain principles of the invention;

FIG. 14 is a view showing a body of the chuck of FIGS. 1 and 13 in accordance with certain principles of the invention;

FIG. 15 is a sectional view showing the components of the chuck of FIGS. 1 and 13 in full assembly and supporting the shank of the first bit of FIG. 2 in accordance with certain principles of the invention;

FIGS. 16, 17, 18 and 19 are partial views showing various optional configurations of a rib formed within the chuck of FIGS. 1 and 13 in accordance with certain principles of the invention;

FIG. 23 is a partial sectional view showing a defined portion of a locking element of the chuck of FIGS. 1 and 13 in locking position within an axially elongated pocket of a bit in accordance with certain principles of the invention;

FIG. 24 is a partial sectional view showing the defined portion of the locking element of FIG. 23 within a pocket of a bit with vectorial force components in accordance with certain principles of the invention.

DETAILED DESCRIPTION OF THE PREFERRED EMBODIMENT

Figure 1:
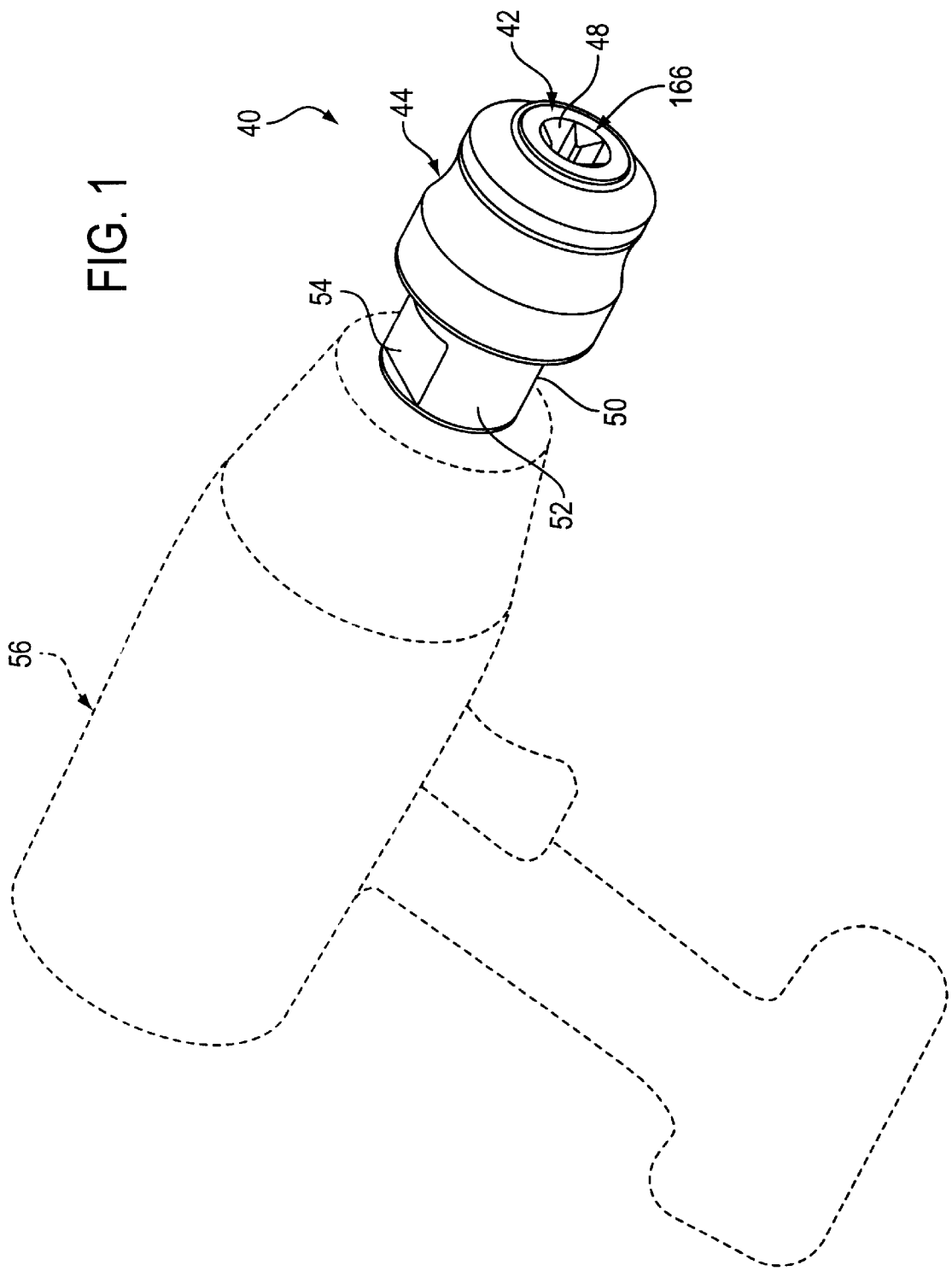
FIG. 1 is a perspective view showing a chuck, in accordance with certain principles of the invention, mounted in a power drill.

As illustrated in FIG. 1, a chuck 40 embodying certain features of the invention disclosed herein includes a body 42, an actuator 44 and a nose piece 46. The body 42 is formed with an opening 48 in a forward portion thereof and a mounting section 50 at a rear portion. An exterior surface 52 of the body 42, in the area of the mounting section 50, is formed on opposite sides with two flat surfaces 54 (one shown) to facilitate the mounting of the chuck 40 onto a powered driver such as, for example, an electrically powered drill 56 shown in phantom.

The chuck 40 is designed to receive and support, within the opening 48 thereof, any of a plurality of bits such as, for example, bits 58, 60, 62 and 64 as illustrated in FIGS. 2, 3, 4 and 5, respectively. Bits 60, 62 and 64 embody certain features of the invention disclosed herein. The bit 58, as disclosed in FIG. 2, is formed along an axis thereof and includes a forward working portion having a screwdriver tip 66. A rearward portion of the bit 58, which extends to a free end 67 thereof, is formed by two spaced hexagonal sections 68 and 70 which are joined by an axially-wide annular groove 72, all of which combine to form a chuck-mountable shank 74. It is noted that the groove 72 forms a locking surface.

Referring to FIG. 3, the bit 60 is formed with a forward working portion such as, for example, a conventional drilling section 76. In this embodiment of the invention, the bit 60 further includes a rearward portion formed with a chuck-mountable shank 78, which has a forward end 77 and a trailing, or free, end 79. The outer diameters of the drilling section 76 and the shank 78 are the same, and the forward end 77 of the shank 78 is located at a juncture of the drilling section 76 and the shank 78.

Three grooves 80, 82 and 84 are formed in the shank 78 and extend in an axial direction from a location of the shank spaced rearward from the forward end 77 thereof to, and through, the free end 79 of the shank. Each of the three grooves 80, 82 and 84 is formed in a "V" shape having spaced opposed side walls 88 and 90 which diverge as the walls extend radially outward from an apex 92 of the groove. A pocket 94, which forms a locking surface, is formed in the shank 78 in adjacent portions of the walls 88 and 90 of each of the grooves 80, 82 and 84, and straddles the apex 92 thereof.

As illustrated in FIG. 4, the structure of the bit 62 is similar to the structure of the bit 60 (FIG. 3), except that the bit 62 is formed with a shank 96 having a diameter smaller than the diameter of a drilling section 98 thereof. Also, each of three grooves 100, 102 and 104, which are formed in an axial direction in the shank 96, is formed with a flat base wall 106 and spaced opposed side walls 108 and 110. Further, each of the grooves 100, 102 and 104 extend in an axial direction from a location of the shank 96 spaced rearward from a forward end 111 thereof to, and through, a trailing or free end 112 thereof. Spaced side edges of the base wall 106 join with respective contiguous side edges of the side walls 108 and 110, with the side walls extending in diverging fashion from the base wall in a direction outward from the axis of the bit 62. A pocket 114, which also forms a locking surface, is formed in the base wall 106, and in adjacent portions of the side walls 108 and 110, of each of the grooves 100, 102 and 104.

As shown in FIG. 5, the structure of the bit 64 is similar to the structure of the bit 62 (FIG. 4), except that each of three grooves 116, 118 and 120, which are formed in an axial direction in a shank 122 of the bit, is formed with a flat base wall 124 and spaced parallel side walls 126 and 128. Also, the diameter of the shank 122 is less than the diameter of a drilling section 127 of the bit 64. Each of the grooves 116, 118 and 120 extend in an axial direction from a location of the shank 122 spaced rearward from a forward end 129 to, and through, a trailing or free end 130 thereof. Spaced side edges of the flat base wall 124 join with respective contiguous side edges of the parallel side walls 126 and 128, with the side walls extending from the flat base wall in a direction outward from the axis of the bit 64. A pocket 132 (FIGS. 11 and 12), which forms a locking surface, is formed in the flat base wall 124 of each of the grooves 116, 118 and 120.

It is noted that the apex 92 and adjacent portions of the side walls 88 and 90 of the shank 78, the flat base wall 106 and adjacent portions of the side walls 108 and 110, and the flat base wall 124 of the shank 122, each constitute a base in which the respective pockets 94, 114 and 132 are formed.

Referring now to FIG. 6, the shank 74 of the bit 58 (FIG. 2) is formed with the annular groove 72, the axially intermediate portion thereof being located by a distance "D" from the free end 67 of the shank. In addition, a base surface, or radially most-inward portion, of the annular groove 72 is located by a distance "$d_3$" from the axis of the shank 74.

As shown in FIG. 7, the pocket 94, which is formed in the shank 78 of the bit 60 (FIG. 3), is more clearly illustrated in a position wherein the pocket straddles the apex 92 of the groove 80 and is formed in the side wall 88 and 90 of the groove. FIG. 8 is a sectional view of the shank 78 which has been taken along the apex 92 of the groove 80 to reveal one of two concave side portions 134 of the pocket 94 being formed in the side wall 88, and a deepest portion 136 of the pocket being formed into the shank radially inward from the apex of the groove. The other concave side portion 134 of the pocket is shown in FIG. 7. As shown clearly in FIG. 8, a flat angled bearing surface 138 is formed in the pocket 94, and is facing generally toward the free end 79 of the shank 78.

As shown in FIG. 8, the apex 92 of the groove 80 is spaced by a distance "$d_1$" from a peripheral surface 140 of the shank 78, which is the depth of the groove and is referred to as "a prescribed groove-depth distance." The deepest portion 136 of the pocket 94 is spaced from the peripheral surface 140 of the shank 78 by a distance "$d_2$," which is referred to as "a prescribed pocket-depth distance." The deepest portion 136 of the pocket 94 is also spaced from the axis of the shank 78 by the distance "$d_3$," which is referred to as "a prescribed radial distance." The distance "$d_4$" is the distance between the peripheral surface 140 of the shank 78 and the axis of the shank, which is referred to as "a prescribed surface distance." Also, the deepest portion 136 of the pocket 94 is spaced axially from the free end 79 of the shank 78 by the distance "D."

Referring to FIGS. 9 and 10, the groove 100 of the bit 62 is shown with the pocket 114 being in full view as formed in the flat base wall 106 and the side walls 108 and 110. A flat angled bearing surface 142 is formed in the pocket 114, and is facing generally toward the free end 112 of the shank 96. The pocket 114 is also formed with a pair of concave side portions 141, and the shank 96 is formed with a peripheral surface 143.

It is noted that a sectional view of FIG. 9, taken in an axial direction along the flat base 106, would closely resemble the sectional view of FIG. 8. Consequently, the distance relationships $d_1$, $d_2$, $d_3$ and $d_4$, as illustrated in FIG. 8, with respect to the shank 78 of the bit 60, are also illustrative of the comparable distance relationships of the shank 96 of the bit 62.

Referring to FIG. 11, the groove 116 of the bit 64 (FIG. 5) is shown with the pocket 132 being fully formed in the shank 122 within the flat base wall 124, with no portions of the pocket being formed in the side walls 126 and 128. A flat angled bearing surface 144 is formed in the pocket 132, and is facing generally toward the free end 130 of the shank 122. A cylindrically concave portion 145 of the pocket 132 is also formed in the flat base wall 124.

In the manner noted above, the distance relationships illustrated in FIG. 8, with respect to the shank 78 of the bit 60, are also illustrative of the comparable distance relationships of the shank 122 of the bit 64. For example, the flat base wall 124 of the groove 116 is spaced by the distance "$d_1$" from a peripheral surface 146 of the shank 122, which is the depth of the groove and, as noted above, is referred to as "the prescribed groove-depth distance." A deepest portion 148 of the pocket 132 is spaced from the peripheral surface 146 of the shank 122 by a distance "$d_2$," which, as noted above, is referred to as "the prescribed pocket-depth distance." The deepest portion 148 of the pocket 132 is also spaced from the axis of the shank 122 by the distance "$d_3$," which, as noted above, is referred to as "the prescribed radial distance." The distance "$d_4$" is the distance between the peripheral surface 146 of the shank 122 and the axis of the shank, which, as noted above, is referred to as "the prescribed surface distance." Also, the deepest portion 148 of the pocket 132 is spaced axially from the free end 130 of the shank 122 by the distance "D."

It is noted that the pockets 94, 114 and 132 of the shanks 78, 96 and 122, respectively, could be formed in the configuration of a pocket 150 (FIG. 23) to accommodate a hammer, or hammer drill, bit 152 (FIG. 23) without departing from the spirit and scope of the invention. Also, the bits 60, 62 and 64 of the invention as illustrated in FIGS. 3 through 12, are formed with round shanks 78, 96 and 122, respectively, with their exterior width parameter being determined by their diameters. The shanks could be formed with exterior configurations other than a round configuration without departing from the spirit and scope of the invention. Regardless of the exterior configuration of the shank, the exterior width parameter is referred to as the external transaxial dimension.

While the illustrations of the working portion of the bit 58 relates to the screwdriver tip 66, and the working portions of the bits 60, 62 and 64 relate to the drilling sections 76, 98 and 127, respectively, other types of working portions could be employed without departing from the spirit and scope of the invention. For example, the principles of this invention could be used with the working portions of bits having a chuck-mountable shank which are used as drilling bits, cutting bits, driving bits and miscellaneous accessories. Various bits of this type could include, but are not limited to, conventional twist drill bits, screwdriver bits, Forstner bits, brad point bits, wood cutting hole saw mandrels, spade bits, masonry drill bits, hammer drill bits, hammer bits, rasps, files, socket drivers and various attachments used for surface treatment including, but not limited to, wire wheel brushes, wire cup brushes, drum sanders, bonnets and backing pads.

In further accordance with the invention, when a set of bits are assembled for use, each bit of the set will include a shank formed with the same groove-and-pocket structure selected from the groove-and-pocket structure of any one of the above-described bits 60, 62 and 64. In this manner, the groove-and-pocket structure is consistent for all bits of any given set.

A set of such bits will include working sections having progressively larger diameters in a conventional manner. The diameters of the shanks of the set of bits will vary depending on the diameters of the respective working sections such as, for example, described above with respect to the bits 60, 62 and 64.

A first bit of the set, having a working portion with a small diameter, will have a shank diameter which is the same as the diameter of the working portion. The bit 60 (FIG. 3) is an example of the first bit of the set.

A second bit of the set, which has a working portion with a diameter larger than the working-portion diameter of the first bit, could have a shank diameter which is smaller than the diameter of the second-bit working portion, but may be larger than the diameter of the shank of the first bit. The bit 62 (FIG. 4) is an example of the second bit of the set.

A third bit of the set, which has a working portion with a diameter larger than the working-portion diameter of the second bit, could have a shank diameter which is smaller than the diameter of the third-bit working portion, but may be larger than the diameter of the shank of the second bit. The bit 64 (FIG. 5) is an example of the third bit of the set.

Additional bits could be included in the set and follow the progression scheme of the first, second and third bits of the set, as described above, or could be interspersed amongst the first, second and third bits according to the relative diameters of the respective bits.

Further, the shanks of the bits could be formed with a diameter which is larger than the diameter of the working portions of such bits without departing from the spirit and scope of the invention.

In a preferred embodiment of a set of bits, the shank of each of the bits is formed with the groove-and-pocket structure of the bit 62 as illustrated in FIGS. 4, 9 and 10. In each bit of this representative set, the shank 96 is formed with the grooves 100, 102 and 104, and the pockets 114. The distance parameters $d_1$, $d_2$, $d_3$ and $d_4$ maintain the relationship described above with respect to the illustration of FIG. 8.

In accordance with one aspect of the invention, the prescribed radial distance $d_3$, that is the distance between the axis of the shank 96 and the pocket 114, is to be the same amongst all of the bits of the set. With this condition, and with the external transaxial dimension, a component of which is the radius distance $d_4$, of the shank 96 varying from one bit to another within the set, the prescribed groove depth distance $d_1$ of each bit of the set will be different from the prescribed groove depth distance $d_1$ of other bits of the set.

In another embodiment, the pocket 114 of the bit 62 could be formed directly through the peripheral surface 143 of, and into, the shank 96 to the location of the prescribed radial distance $d_3$ without departing from the spirit and scope of the invention. The pockets 94 and 132 of the shanks 78 and 122, respectively, could also be formed in the same manner without departing from the spirit and scope of the invention.

Figure 13:
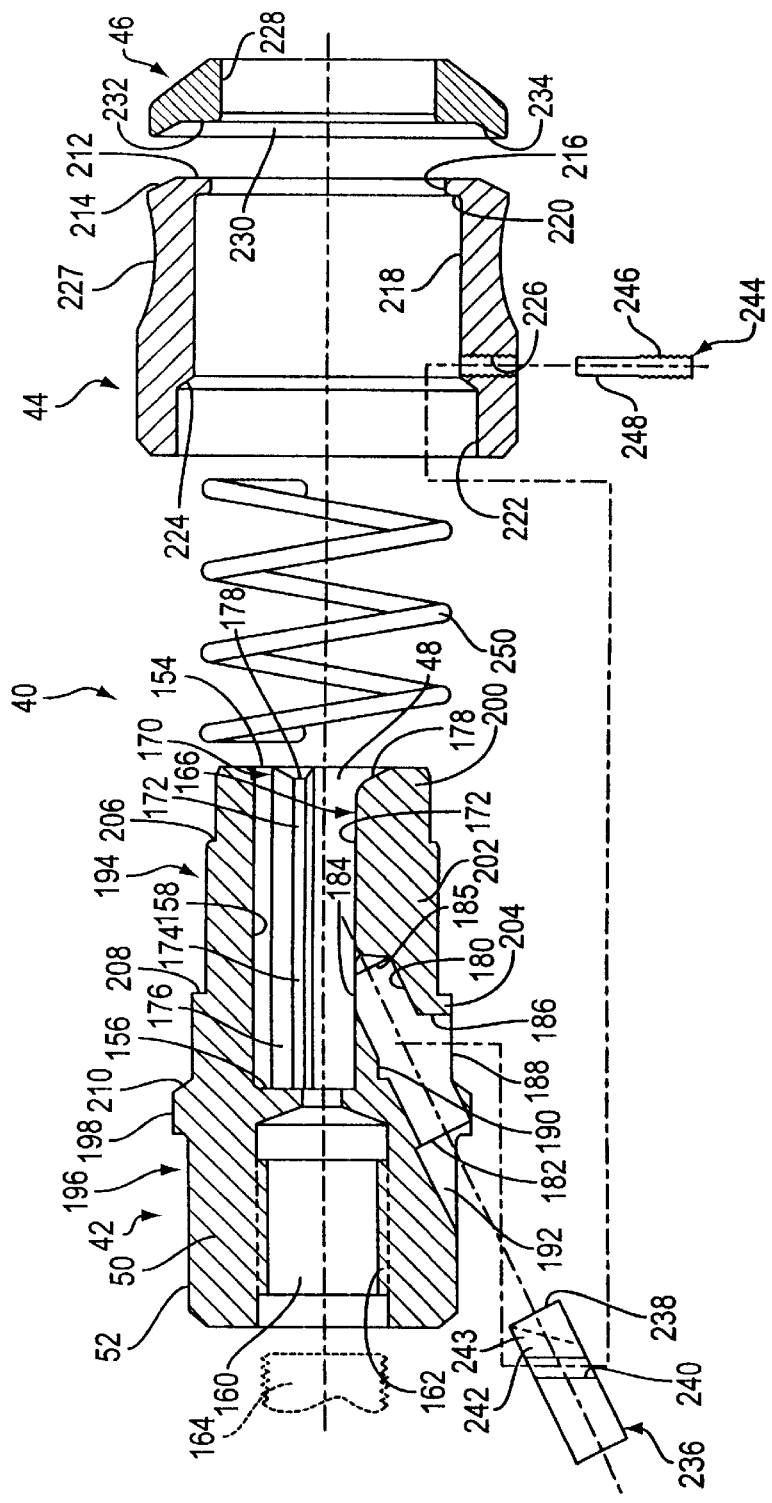
FIG. 13 is an exploded sectional view showing the components of the chuck of FIG. 1 in accordance with certain principles of the invention.

Referring now to FIG. 13, the chuck 40 includes the body 42, the actuator 44 and the nose piece 46. The body 42 is formed along the axis thereof with the opening 48, which is a forward opening of the chuck 40 having an open end 154 and a floor end 156 spaced axially inboard of the open end. The opening 48 is formed with an interior wall 158, which extends between the open end 154 and the floor end 156. A rear bore 160 is formed with threads 162 for receipt of a threaded spindle 164 which extends from a forward end of the powered drill 56 (FIG. 1).

Figure 22:
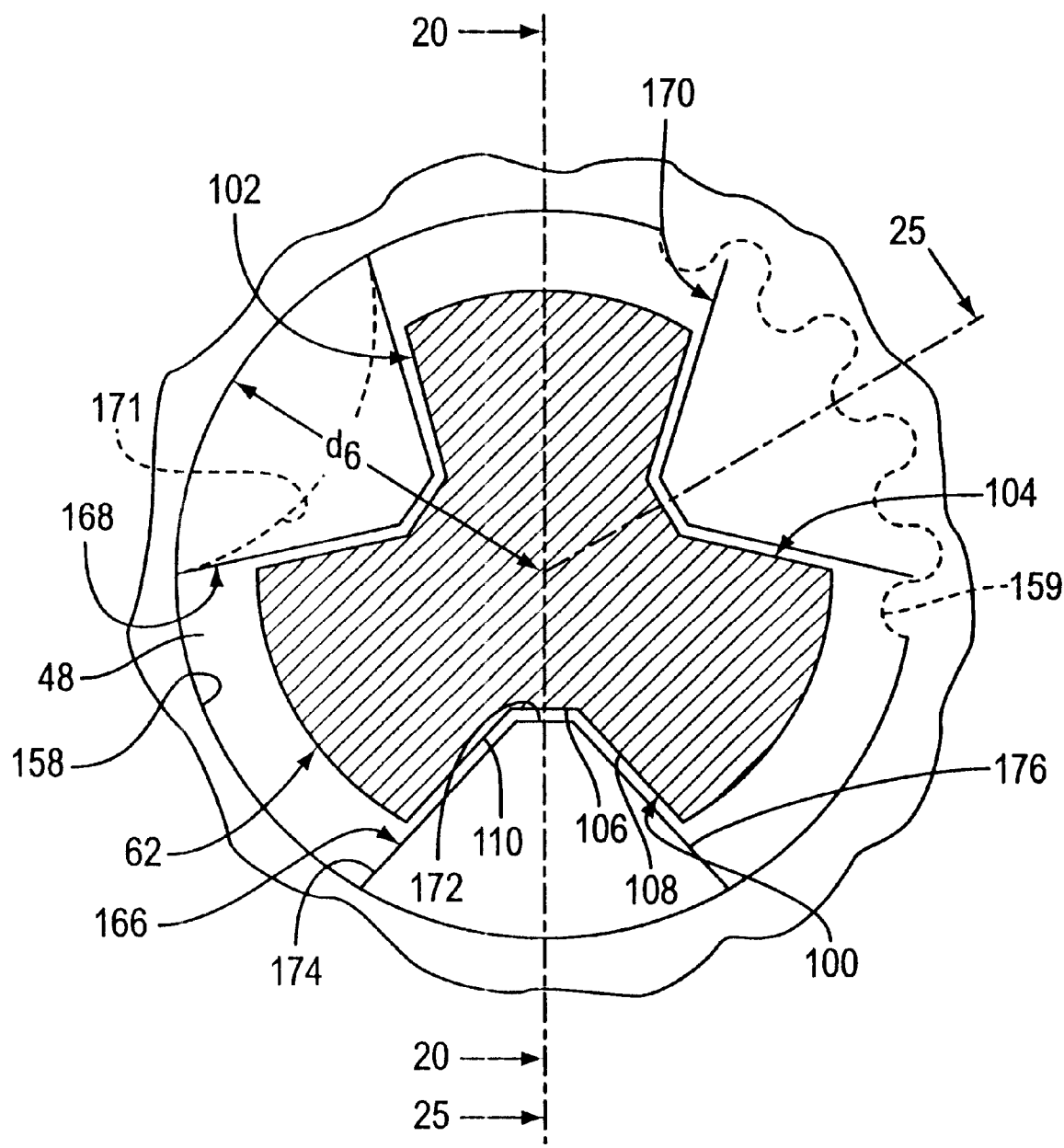
FIG. 22 is a partial sectional view showing the second bit of FIG. 3 in assembly the chuck of FIGS. 1 and 13 in accordance with certain principles of the invention.

As shown in FIGS. 13 and 22, three axially extending lobes, fixed jaws or ribs 166, 168 and 170 are formed on the wall 158 of the opening 48 in an angularly spaced relation and extend radially inward from the wall. In the preferred embodiment, the ribs 166, 168 and 170 are equally angularly spaced within the opening as shown in FIG. 22. Each of the ribs 166, 168 and 170 is formed with an inboard peak surface 172, which is flat in the preferred embodiment illustrated, for example, in FIGS. 13 and 22. Each of the ribs 166, 168 and 170 are also formed with opposite side surfaces 174 and 176 which diverge as the side surfaces extend from the inboard peak surface 172 to their junctures with the wall 158 of the opening 48. The end of each rib 166, 168 and 170, which is located at the open end 154 of the opening 48, is formed with a bevelled surface 178. With the ribs 166, 168 and 170, the chuck 40 can be considered as a fixed-jaw direct-insertion chuck.

The inboard peak surface 172 of the ribs 166, 168 and 170 can be flat and of various widths, as shown with respect to the rib 166 in FIGS. 16, 18 and 19, with the illustration of FIG. 19 being the preferred embodiment. In addition, the inboard peak surface 172 of the ribs 166, 168 and 170 can be generally rounded, as shown with respect to the rib 166 in FIG. 17. In any event, the inboard peak surface 172 can be rounded (FIG. 17) or flat (FIGS. 16, 18 and 19) without departing from the spirit and scope of the invention. In the positions shown in FIGS. 16, 17, 18 and 19, the surface 172 of the ribs 166 engage the adjacent surfaces, respectively, of the bit 58 which provides for drivingly engaging a surface of the bit and the respective rib for rotating the bit upon rotation of the chuck 40.

As shown in FIGS. 16, 17, 18 and 19 with respect to the rib 166, each of the ribs 166, 168 and 170 is formed at a distance "$d_5$" from the interior wall 158 of the body opening 48, which represents a prescribed height for all of the ribs in any embodiment thereof. Therefore, the distance $d_5$ for the prescribed height of each of the ribs 166, 168 and 170 is the same as the distance for the prescribed height of the remaining ribs.

Referring to FIG. 22, in the preferred embodiment of the chuck 40, the opening 48 of the body 42 is cylindrical in shape and extends along the longitudinal axis of the body. Therefore, the distance "$d_6$" from the axis of the chuck 40 to the wall 158 thereof is equal to the radius of a circle formed by the cylindrical shape of the opening 48. The distance $d_6$ is referred to as a prescribed wall distance. The wall 158 of the opening 48 could be formed in a variety of configurations other than circular without departing from the spirit and scope of the invention. For example, the portions of the wall 158 which are located between adjacent ones of the ribs 166, 168 and 170 could be a flat portion, a convex portion 171, or an undulated portion 159. In such instances, the predetermined wall distance $d_6$ would be measured from the base of the ribs 166, 168 and 170 to the longitudinal axis of the chuck 40.

Referring again to FIG. 13, a passage 180 is formed through the body 42 angularly with respect to the axis of the body and extends from an outer open end 182, formed in the exterior surface 52 of the body, to an inner open end 184 at an inboard end of the passage. The passage 180 extends through the body 42 and through the rib 166, with the inner open end 184 being formed through the inboard peak surface 174 of the rib 166 to facilitate communication of the passage with the opening 48 of the body 42. A forward axial wall 185 is formed at a forward end of the passage 180 adjacent the inner open end 184 thereof. The juncture of the inner open end 184 of the passage 180 and the opening 48 of the body 42 is referred to as a prescribed location or a locking location. The axis of the passage 180 extends outward and rearward, at an acute angle, from the axis of the body 42 as shown in FIG. 13.

As shown further in FIG. 13, an elongated slot 186 is formed into the body 42 at a location where the slot is in communication with the passage 180 and extends from an outer open end 188 (FIG. 14), formed in the exterior surface 52 of the body, to a closed end 190 adjacent the passage. As shown in FIG. 14, the slot 186 and the outer open end 188 is elongated in an axial direction. Further, a concave clearance pit 192 is formed in the exterior surface 52 of the body 42 adjacent the outer open end 182 of the passage 180, and extends rearward of the body from the outer open end.

As shown in FIGS. 13 and 14, the exterior of the body 42 is formed with a forward portion 194 and a rearward portion 196 which are separated by an annular flange 198. The forward portion 194 is formed by three stepped cylindrical sections 200, 202 and 204 of small, intermediate and large diameters, respectively. A first annular shoulder 206 is formed at the juncture of the sections 200 and 202, and a second annular shoulder 208 is formed at the juncture of the sections 202 and 204. A bevelled limit shoulder 210 is formed at an angle on a forward edge of the flange 198.

Referring again to FIG. 13, the front of the generally cylindrical actuator 44 is formed with a flat face 212 surrounded radially by a bevelled face 214 formed at a prescribed angle. The actuator is formed with a forward opening 216 at a first diameter and an intermediate opening 218 at a second diameter which is slightly greater than the first diameter, resulting in an annular shoulder 220 at the junction of the forward and intermediate openings. A rear opening 222 is formed in the actuator 44 at a third diameter which is greater than the second diameter, with a travel-limit shoulder 224 formed at an angle between the intermediate and rear openings. It is noted that the angle of the limit shoulder 210 of the body 42 is complementary to the angle of the travel-limit shoulder 224. The actuator 44 is also formed with a through hole 226 which is perpendicular to the axis of the actuator. In the preferred embodiment, the hole 226 is unthreaded. In another embodiment, the hole 226 is threaded. The exterior of the actuator 44 is formed with a concave depression 227, in an axial direction, which facilitates finger placement during user-controlled movement of the actuator.

The nose piece 46 is formed with a forward axial opening 228 with a diameter slightly less than the diameter of the section 200 of the body 42 to facilitate an eventual press-fit assembly of the nose piece with the body section. Further, the nose piece 46 is formed with a rear recess 230 having a radially inner flat surface 232 and a radially outward surface 234 which is formed at an angle complementary to the prescribed angle of the bevelled face 214 of the actuator 44.

The chuck 40 also includes a locking element 236 which is structured to fit slidably into the passage 180 of the body 42. In the preferred embodiment, the locking element 236 is in the form of a pin or rod having a circular cross section and a flat forward end 238, and the passage 180 is formed in an accommodating cylindrical shape. However, the locking element 236 and the passage 180 could be formed in various shapes other than circular or cylindrical without departing from the spirit and scope of the invention. For example, the cross section of the locking element 236 could be square or rectangular, and the forward end 238 could be rounded, or a pointed portion 243 (FIG. 13). At the same time, the passage 180 would be formed with accommodating structure to facilitate sliding movement of the locking element 236 therethrough. A through hole 240 is formed in the locking element 236 at such an angle that the axis of the hole is always perpendicular to the axis of the body 42 upon assembly of the locking element within the passage 180. When the locking element 236 is assembled fully in a forward direction within the passage 180, a forward portion 242 of the locking element extends through the inner open end 184 of the passage, from the inboard peak surface 172 of the rib 166 and into the opening 48 of the body 42 at the prescribed or locking location. The forward portion 242 of the locking element 236 is referred to as a defined portion.

The chuck 40 further includes a drive pin 244 which, in the preferred embodiment, is formed with a smooth exterior surface. In another embodiment, the drive pin 244 is formed with an exterior threaded portion 246 and an exterior unthreaded, or forward, portion 248. A compression spring 250 is also a component of the chuck 40.

Figure 20:
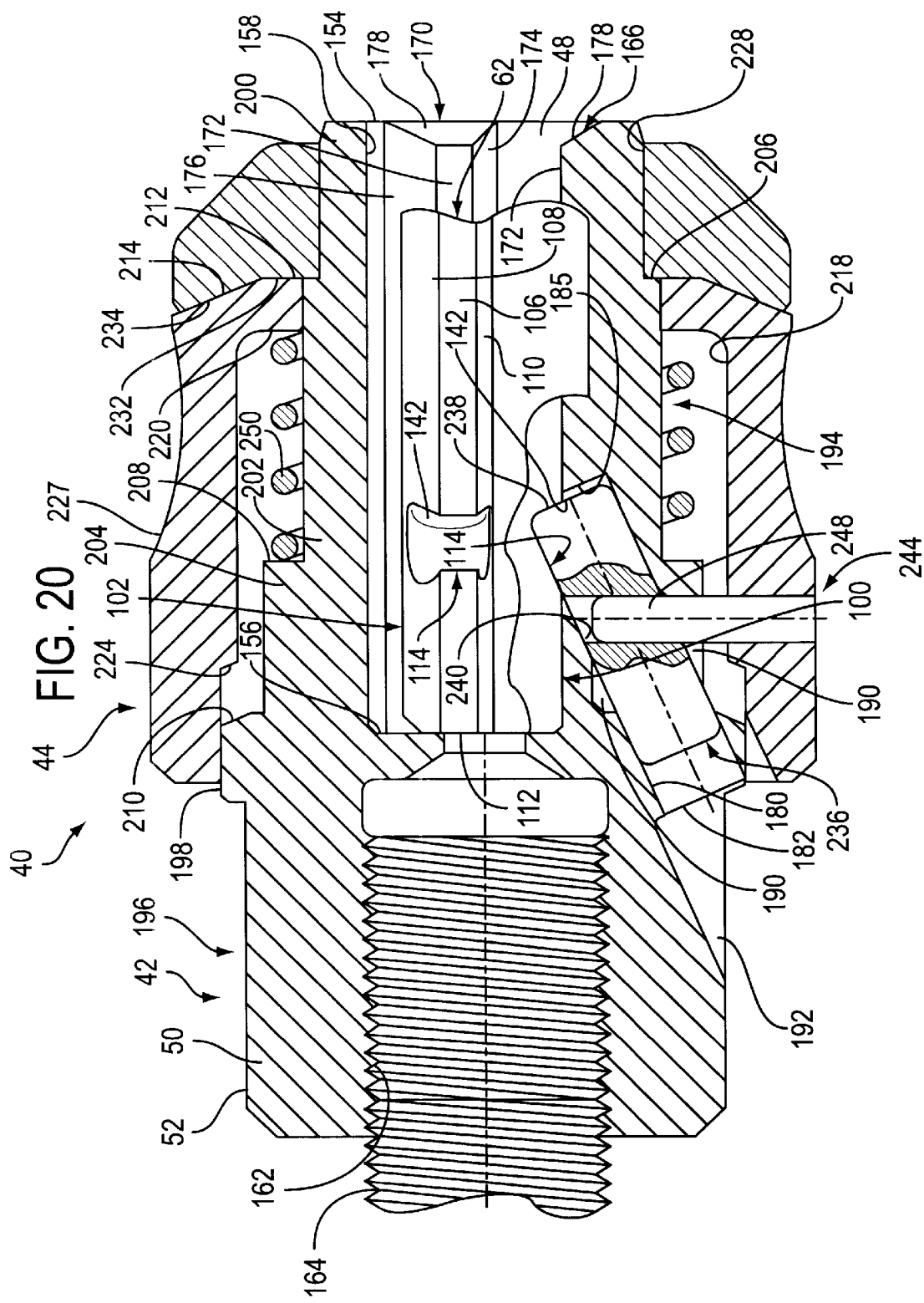
FIG. 20 is a sectional view showing the components of the chuck of FIGS. 1 and 13 in full assembly and supporting the shank of the second bit of FIG. 3 in accordance with certain principles of the invention.

Referring to FIG. 20, in assembling the components which form the chuck 40, the spring 250 is placed axially about the second cylindrical section 202 of the body 42, by moving the spring from the forward end of the body. The actuator 44 is then moved axially over the forward end of the body 42 to a position where the wall of the rear opening 222 is slidably located about the peripheral surface of the flange 198 of the body 42. In addition, the wall of the forward opening 216 of the actuator 44 is slidably positioned about the section 202 of the body 42. At this time, the spring 250 is captured between the annular shoulder 208 of the body 42 and the annular shoulder 220 of the actuator 44. However, the expansion force of the spring 250 may be urging the actuator in a forward direction from the position shown in FIG. 20. Also in this position, the travel-limit shoulder 224 of the actuator 44 is spatially located from, and in alignment with, the limit shoulder 210 of the body 42.

Thereafter, the nose piece 46 is pressed onto the first section 200 of the body 42 to the extent that the inner flat surface 232 of the nose piece is in engagement with the annular shoulder 206 of the body. As the nose piece 46 is pressed onto the first section 200 of the body 42, the surfaces 232 and 234 of the nose piece engage the respective faces 212 and 214 of the actuator 44, and move the actuator axially rearward to a forward limit position shown in FIG. 20. In this arrangement, the actuator 44 is captured on the body 42 but is slidably axially movable over the body within the limits defined by the surfaces 232 and 234 of the nosepiece 46, at the forward limit position, and the limit shoulder 210 of the body 42, at the rear end of the actuator, to a rear limit position. Also, the spring 250 is continuously biased to urge the actuator 44 in an axially forward direction to the forward limit position.

Thereafter, the locking element 236 is inserted into the passage 180 through the outer open end 182 of the passage, and is moved forward so that the defined portion 242 of the locking element protrudes into the opening 48 of the body 42. At this location, the hole 226 of the actuator 44 is aligned generally with the through hole 240 of the locking element 236. The locking element 236 is manipulated to provide precise alignment of the hole 226 and the through hole 240, and the drive pin 244 is inserted and press fit into the hole 226 with the forward portion 248 of the pin being located, but not press fit, in the aligned hole 240 of the locking element 236. In use of the pin 244 of the other embodiment, the pin is inserted into the hole 226 until the threads 246 of the drive pin begin to mesh with the threads of the hole 226. Thereafter, the drive pin 244 is threadedly advanced into the threaded hole 226 whereby the unthreaded, or forward, portion 248 of the drive pin is moved into the aligned hole 240 of the locking element 236.

In this manner, the actuator 44 is coupled to the locking element 236 such that the biasing action of the spring 250 continuously urges the locking element forward into the passage 180 so that the defined portion 242 of the locking element extends into the opening 48 of the body 42. It is noted that, as shown in FIG. 20, the actuator 44 is in its most forward position as established by the surfaces 232 and 234 of the nosepiece 46. Since the locking element 236 is coupled to the actuator 44, the locking element 236 is also shown in its most forward position, where the flat forward end 238 of the locking element is spaced from the forward axial wall 185 of the passage 180. With this structure, a forward clearance is provided for the locking element 236 to insure that the defined portion 242 of the locking element is allowed to extend into the opening 48 of the body 42 to the desired and fullest extent.

The components of the chuck 40 are fully assembled and the chuck may now be assembled threadedly onto the spindle 164 of the powered drill 56.

Referring to FIG. 15, when a user wishes to perform a work operation using the bit 58 with the chuck 40, the user inserts the free end 67 of the hexagonal section 70 of the bit shank 74 into the open end 154 of the opening 48, with the axes of the shank and the chuck being coincidental. During the shank-insertion process, three equally spaced flat faces of the six flat faces of the hexagonal section 70 are placed adjacent and in engagement with the inboard peak surfaces 172 of the ribs 166, 168 and 170. The shank 74 is then moved further into the opening 48 where the free end 67 of the section 70, engages the defined portion 242 of the locking element 236. With continued insertion of the shank 74 further into the opening 48, the defined portion 242 and the locking element 236 are moved rearward in the passage 180 and carry the drive pin 244 in the same rearward direction while the pin slides relatively axially within the hole 240.

Figure 21:
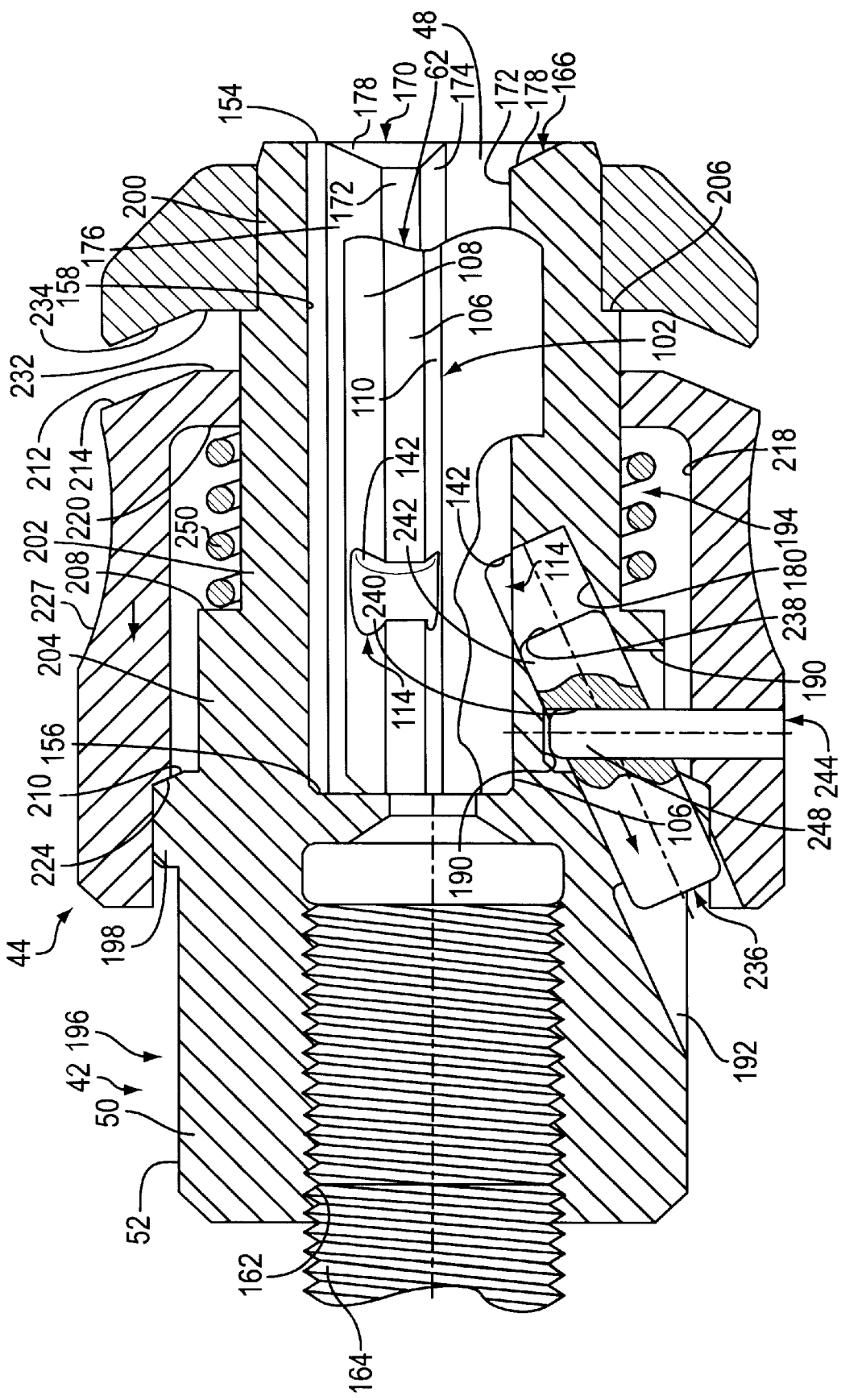
FIG. 21 is a sectional view showing the components of the chuck of FIGS. 1 and 13 in full assembly and conditioned for removal from the chuck of the shank of the second bit of FIG. 3 in accordance with certain principles of the invention.

As the drive pin 244 is moved rearward, the actuator 44, which is attached to the drive pin, is also moved rearward against the biasing action of the spring 250, for example, to the rear limit position shown in FIG. 21, to thereby compress the spring. The energy stored in the compressed spring 250 is continuously urging the actuator 44 in the forward direction. However, one of the flat surfaces of the hexagonal section 70 is being moved over, and blocks, the inner open end 184 of the passage 180, which precludes movement of the defined portion 242 of the locking element 236 in a forward direction in the passage 180. Eventually, the annular groove 72 of the bit shank 74 is moved to a position adjacent the inner open end 184 of the passage 180 to provide an opportunity for the defined portion 242 of the locking element 236 to move forward through the inner open end.

With the energy stored in the compressed spring 250, and with the defined portion 242 of the locking element cleared to move through the inner open end of the passage 180, the actuator 44 moves to the forward limit position shown in FIG. 15. As the actuator 44 moves to the forward limit position, the locking element 236 is moved forward in the passage 180, through its coupling with the actuator, thereby to move the defined portion 242 into the space defined by the annular groove 72. In this manner, the shank 74 of the bit 58 is locked with the chuck 40.

At the same time, the free end 67 of the shank 74 of the bit 58 engages the floor wall 156 of the opening 48. In this position, the three flat surfaces of the hexagonal shank 74 are firmly in engagement with the inboard peak surfaces 172 of respective ones of the ribs 166, 168 and 170 to provide a driving link between the chuck 40 and the bit 58.

With the bit 58 locked with the chuck 40, and the shank 74 in driving engagement with the ribs 166, 168 and 170, the user may now proceed with the work operation by operation of the powered drill 56.

As noted above, and as shown in FIGS. 16, 17, 18 and 19, the hexagonal shank 74 of the bit 58 can be mounted with the chuck 40 by use of a variety of configurations of the ribs 166, 168 and 170 without departing from the spirit and scope of the invention.

In the preferred embodiment, the acute angle formed between the axis of the locking element 236 and the axis of the chuck 40 is within a range between twenty-five degrees and thirty degrees. With the acute angle falling in this range, the bit is firmly locked against unwanted pull-out of the chuck 40 in the event that the bit becomes stuck in a hole just formed in a drilling operation by use of the bit. If the acute angle of the axis of the locking element 236 was greater than thirty degrees, cam-out forces could be produced on the locking element such that the locking element might retract inadvertently when the chuck is withdrawn from a situation where the bit is stuck in the hole. Also, with the acute angle range of the above-noted preferred embodiment, the bit can be inserted and locked within the chuck 40 without requiring the user to retract actuator 44. This is a time-saving convenience which users will appreciate.

Referring to FIGS. 20 and 22, the bit 62 has been assembled with the chuck 40 in a manner similar to the assembly of the bit 58 with the chuck, as described above, with the axes of the bit and the chuck being coincidental. Prior to such assembly, the grooves 100, 102 and 104 are aligned with the ribs 166, 168 and 170, respectively. The bit 62 is then moved axially rearward into the opening 48 so that the grooves 100, 102 and 104 engage and glide over the respective ribs 166, 168 and 170 until the free end 112 of the bit engages the floor wall 156, whereby the grooves are nested over at least portions of the ribs.

During the insertion movement of the bit 62, the defined portion 242 of the locking element 236 is moved into the passage 180 in the manner described above to allow continued insertion movement of the bit, and to move the actuator 44 rearward to compress the spring 250. When the free end 112 of the bit 62 engages the floor wall 156, the pocket 114 is in place adjacent the inner open end 184 of the passage 180 to allow movement of the defined portion 242 of the locking element 236 into the pocket 114 at the prescribed or locking location.

The actuator 44 is now urged forward by the spring 250 to the forward limit position, whereby the defined portion 242 of the locking element 236 moves into the pocket 114 of the bit 62 to lock the bit with the chuck 40.

In FIG. 22, the illustrated spacing between the interfacing portions of the grooves 100, 102 and 104 and the respective ribs 166, 168 and 170 are shown only to illustrate a clear depiction of the interfacing relationship between the grooves and ribs. In reality, the base surfaces 106 and the side walls 108 and 110 of the grooves 100, 102 and 104 slidingly engage the inboard peak surfaces 172 and the side surfaces 174 and 176, respectively, of the ribs 166, 168 and 170.

In another embodiment of the invention relating only to the locking of a bit with the chuck 40, at least one nub or protrusion extends radially from the wall 158 of the opening 48 in lieu of the ribs 166, 168 and 170. The protrusion is located and sized sufficiently to provide surrounding structure for the portion of the passage 180 which would normally have been provided by the rib 166, for example, and includes the inner open end 184 formed in the inboard peak surface 172. Any bit to be assembled with the chuck 40 would be formed with a groove and pocket arrangement such as, for example, the groove 100 and the pocket 114 of the bit 62.

In still another embodiment of the invention relating only to the locking of a bit with the chuck 40, the defined portion 242 of the locking element 236, as well as a forward portion of the locking element, would extend from an inner open end of the passage 180 which is formed in the wall 158 of the opening 48, rather than at the inboard peak surface 172 of the rib 166. The locking element 236 would extend into the opening 48 to a location spaced by a given distance from the axis of the chuck 40 which is the same as the distance that the locking element extends in the illustration of FIG. 20. Any bit to be assembled with such a modified chuck would be formed with accommodating structure.

If the user desires to remove the bit 62 from assembly with the chuck 40, the user moves the actuator 44, against the biasing action of the spring 250, to the position shown in FIG. 21 to retract the defined portion 242 of the locking element 236 within the passage 180. The bit 62 can be manually withdrawn from the opening 48, or could be dislodged for gravity discharge if desired.

It is noted that each bit, for example, the bit 62, could include only one pocket 114 which would be located at the base of one of the grooves 100, 102 and 104 without departing from the spirit and scope of the invention. The versatility of the assembly process of the bit 62 with the chuck 40 is enhanced, however, by forming one pocket 114 in the base of each of the grooves 100, 102 and 104, as described above.

As noted above, at least some bits, if not all, of a set of bits will include shanks of different diameters. When using the chuck 40, the pockets of each bit of the set of bits are always located at the prescribed locking location, i.e., the prescribed radial distance from the axis of the bit, regardless of the diameter of the shanks thereof. To accommodate this requirement, the groove of a shank having a smaller diameter will have a prescribed groove-depth distance $d_1$ which is smaller than the groove of a shank having a larger diameter.

The prescribed height $d_5$ of each of the ribs 166, 168 and 170 of the chuck 40 is always the same as the other ribs. Therefore, the side walls 108 and 110 of the grooves 100, 102 and 104 of a bit with a larger shank will extend further toward the interior wall 158 of the chuck 40 than the groove side walls of a bit having a smaller diameter. Regardless of the differences in the diameters of different shanks, the grooves 100, 102 and 104 of the bits will be positioned over, and in driving engagement with, the interfacing portions of the respective ribs 166, 168 and 170.

Referring to FIG. 24, in addition to facilitating the locking of the bit 62 within the chuck 40, the locking element 236 is constantly being urged in a forward direction within the passage 180 by the spring 250, in a direction represented by a force vector "Z." The force vector "Z" has a horizontal component vector "X" and a vertical component vector "Y." The force, as provided by the spring 250, and associated with the vertical component vector "Y," is constantly urging the bit 62 inward toward the axis of the chuck 40, and effectively presses the bit radially into a firm position within the opening 48 of the chuck.

Conversely, when the shank 96 of the bit 62 is being inserted into the opening 48 of the chuck 40, the shank pushes the defined portion 242 of the locking element 236 in a retracting direction into the passage 180. The retracting direction of movement of the locking element 236 has a vector component which is opposite the direction of the vector "X" but is in the same as the direction of insertion of the bit 62.

Figure 25:
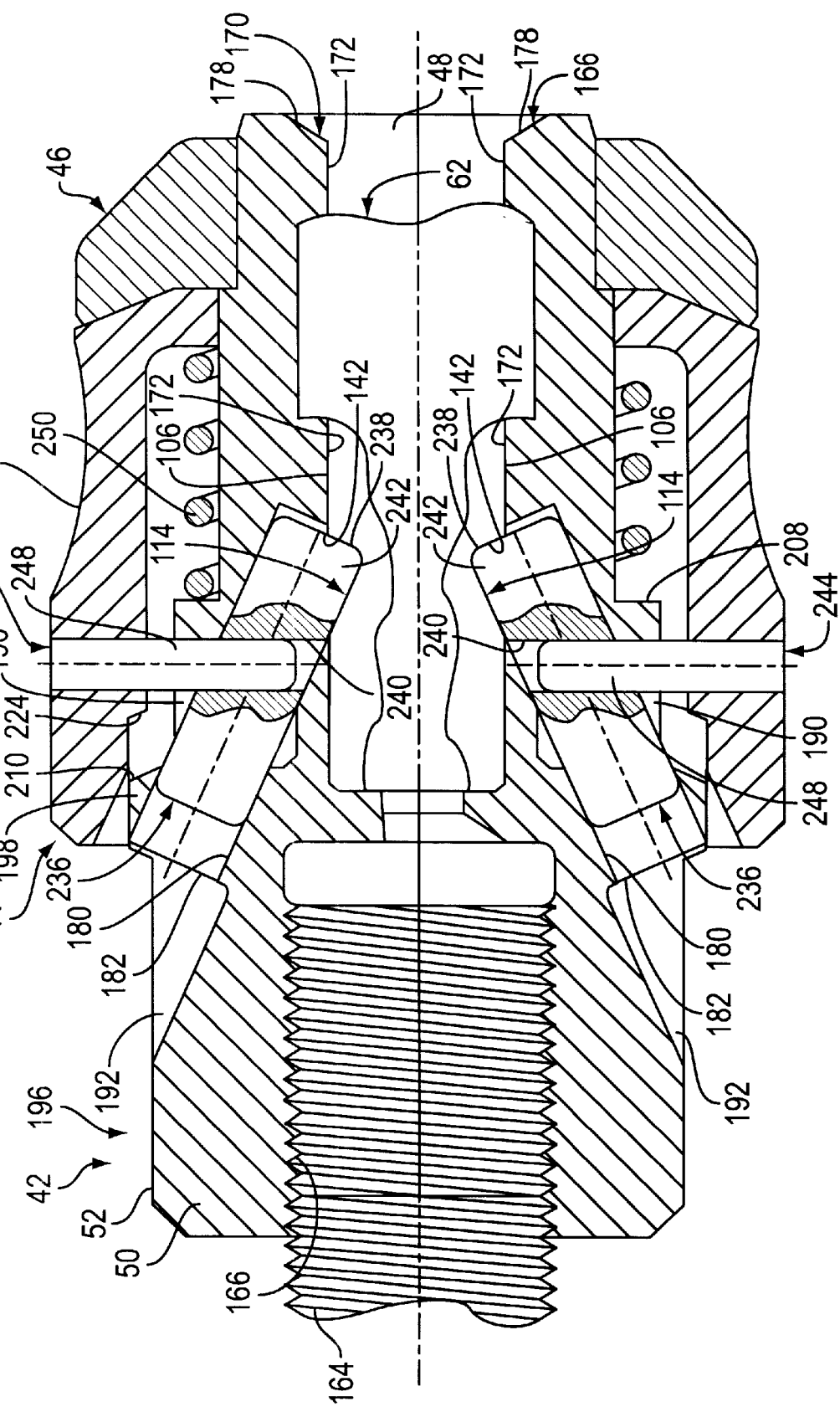
FIG. 25 is a sectional view showing the components of the chuck of FIGS. 1 and 13 in full assembly and including a pair of locking elements for locking a bit in assembly with the chuck in accordance with certain principles of the invention.

Referring to FIG. 25, the chuck 40 is formed with a second passage 180 which supports, for sliding movement, a second locking element 236. The second locking element 236 is coupled to the actuator 44 through a second drive pin 244. Both of the locking elements 236 function in the manner described above with respect to the chuck 40 having a single locking element, and provide enhanced locking of the bit 62 with the chuck as well as reduced wear of the locking elements. In like manner, a third locking element, such as the locking element 236, could be employed in such a manner that a locking element would be associated with each of the driving ribs 166, 168 and 170.

The constancy of the prescribed radial distance $d_1$ of the pockets of all bits of a set, and the prescribed height $d_5$ of the ribs of the chuck, allow for a chuck-and-bit assembly embodying certain principles of the invention. For example, the ribs 166, 168 and 170 are stationary within the chuck 40, yet the ribs provide the driving link between the chuck 40 and any bits such as the bits 60, 62 and 64 having pockets 94, 114 and 132, respectively. This concept allows the ribs 166, 168 and 170 to be essentially dedicated to the transferring of a rotary drive force to the bits 60, 62 and 64, and does not require the ribs to also lock the bits within the chuck.

At the same time, the locking element 236 always extends the same distance, regardless of differences in the diameters of the shanks of the bits assembled with the chuck 40, to mate lockingly with the pockets of the bits. Thus, the locking element 236 is essentially dedicated to locking the bits 60, 62 and 64 within the chuck 40.

The chuck 40, the bits 60, 62 and 64 and a chuck-and-bit assembly, which uses the chuck and the bits, provides a bit supporting system which is efficient and easy to use. The bits 60, 62 and 64 are readily and quickly interchangeable with the chuck 40, while providing firm locking of the bits within the chuck and a solid interfacing driving link.

The chuck 40 could include jaws or ribs which are movable, relative to the chuck body 42, into the grooves of the bits to effectively provide the driving engagement for rotating the bits upon rotation of the chuck. Also, the pockets In general, the above-identified embodiments are not to be construed as limiting the breadth of the present invention. Modifications, and other alternative constructions, will be apparent which are within the spirit and scope of the invention as defined in the appended claims.

What is claimed is:

1. A chuck for receiving and supporting any one of a plurality of bits, each bit being formed with a chuck-mountable shank having an axis and an external transaxial dimension which is different from the external transaxial dimension of the other of the plurality of bits, which comprises:

a body having an opening therein for receipt of the bits;

the opening of the body formed with a wall;

at least one rib formed on and extending inward from the wall of the opening of the body; and the opening and the rib each being of a prescribed size and configuration for receipt and support of the chuck-mountable shank of any one of the plurality of bits having shanks of different external transaxial dimensions.

2. The chuck as set forth in claim 1, which further comprises:

the rib being located to drivingly engage each of the plurality of bits upon insertion of the bits individually into the opening.

3. A chuck for receiving and supporting any one of a plurality of bits, each bit being formed with a chuck-mountable shank having an axis and an external transaxial dimension which is different from the external transaxial dimension of the other of the plurality of bits, which comprises:

a body having an opening therein formed along an axis thereof for receipt of the bits;

a locking element mounted for movement relative to the body for locking any of the plurality of bits within the opening of the body;

the locking element having at least a defined portion thereof which is normally extendable into the opening of the body to a prescribed location radially outboard of the axis of the body; and the prescribed location of the defined portion of the locking element being the same for any of the plurality of bits which are to be locked within the opening of the body.

4. The chuck as set forth in claim 3, which further comprises:

an actuator mounted movably on the body and coupled to the locking element where, upon selective movement of the actuator relative to the body, the locking element is moved at least radially away from the axis of the body to withdraw the defined portion of the locking element from within the opening of the body.

5. The chuck as set forth in claim 3, which further comprises:

the opening of the body formed with a wall;

at least one rib formed on and extending inward from the wall of the opening of the body; and the opening and the rib each being of a prescribed size and configuration for receipt and support of the chuck-mountable shank of any one of the plurality of bits having shanks of different external transaxial dimensions.

6. The chuck as set forth in claim 3, wherein each of the plurality of bits is formed with a free end of the chuck-mountable shank which is a leading end of the bit in the direction in which the bit is being inserted into the opening, and which further comprises:

the locking element being mounted on the body for engagement with the free end of the chuck-mountable shank of each of the plurality of bits as each bit is being inserted into the opening of the body;

the locking element being mounted on the body for movement following engagement with the leading end of the bit and upon continued insertion movement of the bit into the opening of the body; and the locking element being mounted on the body to have at least one vectorial component of movement in a direction which is the same as the direction of movement of the chuck-mountable shank being inserted into the opening of the body.

7. A chuck for receiving and supporting a bit, which comprises:

a body having an opening therein formed along an axis thereof for receipt of the bit;

the opening formed with a wall having at least a portion thereof which is spaced from the axis of the body by a prescribed wall distance;

a locking element mounted for movement relative to the body for locking the bit within the opening of the body; and the locking element having a defined portion thereof which is positioned normally at a location within the opening and which normally extends from an intermediate location spaced inwardly from the wall of the opening by a prescribed intermediate distance from the axis of the body, which is less than the prescribed wall distance.

8. The chuck as set forth in claim 7, wherein the prescribed intermediate distance is a prescribed first distance, and which further comprises:

the defined portion of the locking element having a forward end positioned at a normal location within the opening inward of the wall by a prescribed second distance from the axis of the body which is less than the prescribed first distance.

9. A chuck for receiving and supporting any one of a plurality of bits, each bit being formed with a chuck-mountable shank having an axis and an external transaxial dimension which is different from the external transaxial dimension of the other of the plurality of bits, which comprises:

a body having an opening therein formed along an axis thereof for receipt of the bit;

the opening formed with a wall having at least a portion thereof which is spaced from the axis of the body by a prescribed wall distance;

a locking element mounted for movement relative to the body for locking the bit within the opening of the body;

the locking element having at least a defined portion thereof which is normally extendable from a first location spaced inwardly from the wall of the opening by a prescribed first distance from the axis of the body, which is less than the prescribed wall distance, to a second location inward of the wall by prescribed second distance from the axis of the body, which is less than the prescribed first distance; and the location of the normally extendable defined portion of the locking element being the same for any of the plurality of bits which are to be locked within the opening of the body.

10. A chuck for receiving and supporting a bit, which comprises:

a body having an opening therein formed along an axis thereof for receipt of the bit;

the opening formed with a wall having at least a portion thereof which is spaced from the axis of the body;

a protrusion formed on the wall and extending a prescribed distance toward the axis of the body;

a passage formed in, and enclosed by, the protrusion in communication with the opening of the body; and a locking element mounted within the passage for movement relative to the body for locking the bit within the opening of the body.

11. The chuck as set forth in claim 10, which further comprises:

the locking element having at least a defined portion thereof which is normally extendable from the passage into the opening of the body.

12. A chuck for receiving and supporting a bit, which comprises:

a body having an opening therein formed along an axis thereof for receipt of the bit;

the opening formed with a wall and having an open end and a floor end spaced axially from the open end;

at least one rib formed on and extending inward from the wall of the opening of the body and between the open end and the floor end of the opening;

the at least one rib formed with a surface which faces the axis of the body and is spaced from the axis; and a locking element for locking the bit with the body and having a defined portion thereof which is positioned normally at a location within the opening and which normally extends into the opening of the body from the surface of the at least one rib at a prescribed distance from the axis of the body.

13. The chuck as set forth in claim 12, which further comprises:

an actuator coupled to the locking element for selective movement of the locking element relative to the body and the at least one rib.

14. The chuck as set forth in claim 13, which further comprises:

the actuator mounted on the body for limited movement relative thereto.

15. The chuck as set forth in claim 14, which further comprises:

the actuator mounted biasingly on the body to normally urge the defined portion of the locking element from the surface of the at least one rib and into the opening.

16. The chuck as set forth in claim 12, which further comprises:

a passage formed at least in the at least one rib which is in communication with the opening at a juncture of the passage and the surface of the at least one rib; and the locking element located movably within the passage with the defined portion of the locking element extendable from the passage into the opening of the body at the juncture thereof.

17. The chuck as set forth in claim 10, wherein the at least one rib extends in an axial direction within the opening of the body parallel to the axis of the body.

18. The chuck as set forth in claim 12, wherein the at least one rib is a first rib and the surface is a first rib surface, which further comprises:

a second rib formed on and extending inward from the wall of the opening of the body and located between the open end and the floor end of the opening at a location spaced angularly from the first rib; and the second rib formed with a second rib surface which faces and is spaced from the axis.

19. The chuck as set forth in claim 18, which further comprises:

the defined portion of the locking element being positioned to normally urge the bit into firm engagement with the second surface of the second rib.

20. The chuck as set forth in claim 18, wherein the locking element is a first locking element, which further comprises:

a second locking element for locking the bit with the body and having a defined portion thereof which is normally extendable into the opening of the body from the second surface of the second rib at a prescribed distance from the axis of the body.

21. A chuck is for receiving and supporting any one of a plurality of bits, each bit being formed with a chuck-mountable shank having an axis and an external transaxial dimension which is different from the external transaxial dimension of the other of the plurality of bits, which comprises:

a body having an opening therein formed along an axis thereof for receipt of the bit;

the opening formed with a wall and having an open end and a floor end spaced axially from the open end;

at least one rib formed on and extending inward from the wall of the opening of the body and between the open end and the floor end of the opening;

the at least one rib formed with a surface which faces the axis of the body and is spaced from the axis;

a locking element for locking the bit with the body and having at least a defined portion thereof which is normally extendable into the opening of the body from the surface of the at least one rib at a prescribed distance from the axis of the body; and the prescribed distance of the defined portion of the locking element being the same for any of the plurality of bits which are to be locked within the opening of the body.

22. A chuck for receiving and supporting any one of a plurality of bits, each bit being formed with a chuck-mountable shank having an axis and an external transaxial dimension which is different from the external transaxial dimension of the other of the plurality of bits, which further comprises:

a body having an opening therein formed along an axis thereof for receipt of the bit;

the opening formed with a wall and having an open end and a floor end spaced axially from the open end;

at least one rib formed on and extending inward from the wall of the opening of the body and between the open end and the floor end of the opening;

the at least one rib formed with a surface which faces the axis of the body and is spaced from the axis;

a locking element for locking the bit with the body and having at least a defined portion thereof which is normally extendable into the opening of the body from the surface of the at least one rib at a prescribed distance from the axis of the body; and the opening and the at least one rib each being of a prescribed size and configuration for receipt and support of the chuck-mountable shank of any one of the plurality of bits having shanks of different external transaxial dimensions.

23. A bit for assembly with a chuck, which comprises:

a chuck-mountable shank formed along an axis thereof and formed with a peripheral surface which is spaced from the axis by a prescribed surface distance;

the shank being formed with a free end;

an opening formed in the peripheral surface of the shank and extending toward the axis of the shank;

the opening extending for a prescribed axial distance through and from the free end of the shank to a closed inboard end of the opening;

the opening formed with surface portions which are uniformly structured and uninterrupted from the free end of the shank to the closed inboard of the opening; and a single pocket having an axial length less than the prescribed axial length formed in the shank within the opening thereof at a location which is at a prescribed axial distance from the free end of the shank.

24. A bit for assembly with a chuck, which comprises:

a chuck-mountable shank formed along an axis thereof and formed with a peripheral surface which is spaced from the axis by a prescribed surface distance;

the shank being formed with a free end;

an opening formed in the peripheral surface of the shank and extending toward the axis of the shank;

the opening extending for a prescribed axial distance through and from the free end of the shank to a closed inboard end of the opening;

the opening formed with surface portions which are uniformly structured and uninterrupted from the free end of the shank to the closed inboard of the opening; and a single pocket having an axial length less than the prescribed axial distance formed in the shank within the opening thereof to a location at a prescribed radial distance from the axis of the shank which is less than the prescribed surface distance.

25. A bit for assembly with a chuck, which comprises:

a chuck-mountable shank formed along an axis thereof;

the shank formed with a free end;

at least one groove formed in the shank extending for a prescribed axial distance through and from the free end thereof to a closed inboard end of the groove;

the at least one groove being formed with at least one wall which is uniformly structured and uninterrupted from the free end of the shank to the closed inboard end of the opening; and a single pocket having an axial length less than the prescribed axial distance formed in the wall at a prescribed radial distance from the axis of the shank.

26. The bit as set forth in claim 25, which further comprises:

the shank being formed with a peripheral surface which is located a prescribed surface distance from the axis of the bit;

the at least one groove being formed to a prescribed groove-depth distance from the peripheral surface which is less than the prescribed surface distance; and the pocket being formed to a prescribed pocket-depth distance from the peripheral surface which is greater than the prescribed groove-depth distance.

27. The bit as set forth in claim 25, which further comprises, the pocket formed with a bearing surface which is located to engage a locking element of the chuck.

28. The bit as set forth in claim 25, which further comprises:

the at least one groove having a pair of spaced opposed side walls formed in a "V" shape with an apex thereof forming the base of the at least one groove.

29. The bit as set forth in claim 28, which further comprises:

the pocket formed in adjacent portions of the pair of spaced side walls and straddling the apex of the at least one groove.

30. The bit as set forth in claim 25, wherein the at least one groove comprises:

a base wall having opposite side edges; and a pair of spaced opposed side walls each of which has a side edge contiguous with a respective one of the opposite side edges of the base wall.

31. The bit as set forth in claim 30, which further comprises:

the spaced opposed side walls of the at least one groove extending outward from the base wall in diverging fashion with respect to each other.

32. The bit as set forth in claim 30, which further comprises:

the pocket formed in the flat surface of the base and in portions of the side walls adjacent the flat surface.

33. The bit as set forth in claim 30, which further comprises:

the spaced opposed side walls of the at least one groove extending outward from, and perpendicular with, the base wall.

34. The bit as set forth in claim 33, which further comprises:

the pocket formed in the base wall.

35. The bit as set forth in claim 25, wherein the at least one groove is a first groove, the prescribed radial distance is a prescribed first-groove radial distance and the pocket is a first pocket, which further comprises:

a second groove formed in the shank extending through the free end;

the second groove being angularly displaced from the first groove;

the second groove being formed with at least one wall; and a second pocket formed in the one wall of the second groove at a prescribed second-groove radial distance from the axis of the shank.

36. The bit as set forth in claim 35, which further comprises:

the prescribed first-groove and second-groove radial distances of the first and second pockets, respectively, being the same.

37. A set of bits for assembly with a chuck, which comprises:

a first bit;

a second bit;

each of the first and second bits having a chuck-mountable shank formed along an axis thereof;

the shank of each of the first and second bits formed with a forward end and a trailing end;

a groove formed in the first bit between the forward and trailing ends of the shank and at a prescribed depth;

a pocket formed in the shank within the groove of the first bit and located at a prescribed radial distance from the axis of the bit;

a groove formed in the second bit between the forward and trailing ends of the shank and at a depth which is different from the prescribed depth; and a pocket formed in the shank within groove of the second bit and located at a radial distance from the axis of the bit which is the same as the prescribed radial distance.

38. A set of bits for assembly with a chuck, which comprises:

a first bit having a chuck-mountable first-bit shank formed along a first-bit axis thereof;

a second bit having a chuck-mountable second-bit shank formed along a second-bit axis thereof;

the first-bit shank having a first-bit outer surface, at least a first-bit portion of which is located by a prescribed first-bit surface distance from the first-bit axis;

the second-bit shank having a second-bit outer surface, at least a second-bit portion of which is located by a second-bit surface distance from the second-bit axis which second-bit surface distance is different from the prescribed first-bit surface distance;

a first-bit pocket formed in the first-bit shank to a location between the first-bit portion of the first-bit outer surface and the first-bit axis and which faces in a direction outward and away from the first-bit axis;

the first-bit pocket being formed at a prescribed first-bit pocket distance from the first-bit axis which is less than the prescribed first-bit surface distance;

a second-bit pocket formed in the second-bit shank to a location between the second-bit portion of the second-bit outer surface and the second-bit axis and which faces in a direction outward and away from the second-bit axis; and the second-bit pocket being formed at a prescribed second-bit pocket distance from the second-bit axis which is less than the prescribed second-bit surface distance and which is the same as the prescribed first-bit pocket distance.

39. A set of bits for assembly with a chuck, which comprises:

each bit of the set formed with a chuck-mountable shank having an axis and an external transaxial dimension which is different from the external transaxial dimension of other bits of the set;

the shank of each bit of the set formed with a free end;

at least one groove formed in an axial direction in the shank of each bit of the set and through the free end;

the at least one groove of each bit of the set formed with a base;

a pocket formed in at least a portion of the base of the at least one groove of each bit of the set at a prescribed radial distance from the axis of the shank; and the prescribed radial distances of the bits of the set being the same.

40. An assembly of a chuck and a bit mounted therein, which comprises:

the chuck comprising:

a body having an opening therein formed along an axis thereof for receipt of the bit;

the opening formed with a wall having at least a portion thereof which is spaced from the axis of the body by a prescribed wall distance;

a locking element mounted for movement relative to the body for locking the bit within the opening of the body; and the locking element having a defined portion thereof which is positioned normally at a location within the opening and which normally extends from an intermediate location spaced inwardly from the wall of the opening by a prescribed intermediate distance from the axis of the body, which is less than the prescribed wall distance;

the bit comprising:

a chuck-mountable shank formed along an axis thereof;

a groove formed in the shank in an axial direction; and a pocket formed in at least a portion of an outwardly facing surface of the groove at a prescribed radial distance from the axis of the shank;

the axis of the shank being coincidental with the axis of the body of the chuck upon assembly of the bit within the opening of the body;

the locking location and the pocket of the bit defining substantially the same location within the assembled chuck and bit; and the defined portion of the locking element being located within the pocket of the bit at the locking location to thereby lock the bit with the chuck.

41. The assembly as set forth in claim 40, which further comprises:

a protrusion formed on the wall of the body and extending toward the axis of the body;

a passage formed in the protrusion in communication with the opening of the body; and the locking element mounted within the passage for movement relative to the body with the defined portion of the locking element extendable from the passage and into the pocket to lock the bit in assembly with the chuck.

42. The assembly as set forth in claim 40, which further comprises:
- at least one rib formed on the wall of the opening of the body and extending toward the axis of the body;
- at least one groove formed on an outer surface of the shank of the bit; and
- the at least one rib of the body and the at least one groove of the bit being complementary in configuration such that the at least one groove nests at least over a portion of the at least one rib for driving engagement.

43. The assembly as set forth in claim 42, which further comprises:
- the at least one groove being formed with a base;
- the pocket being formed at least partially in the base of the at least one groove; and
- the defined portion of the locking element extending from a portion of the at least one rib adjacent the pocket and into the pocket to lock the bit with the chuck.

44. The assembly as set forth in claim 42, which further comprises:
- a passage formed in the at least one rib and communicating with the opening of the body; and
- the locking element being located movably within the passage with the defined portion being extendable from the passage and into the pocket.

45. The assembly as set forth in claim 42, wherein the at least one rib of the chuck is a first rib, and the at least one groove of the bit is a first groove, which further comprises:
- a second rib formed on the wall of the opening of the body and extending toward the axis of the body;
- a second groove formed on an outer surface of the shank of the bit;
- the second rib of the body and the second groove of the bit being complementary in configuration such that the second groove nests at least over a portion of the second rib for driving engagement; and
- the defined portion of the locking element being positioned to normally urge the bit into firm engagement with the second rib.

46. The assembly as set forth in claim 42, wherein the at least one rib of the chuck is a first rib, the locking element of the chuck is a first locking element, the at least one groove of the bit is a first groove, and the pocket of the bit is a first pocket, which further comprises:
- a second rib formed on the wall of the opening of the body and extending toward the axis of the body;
- a second groove formed on an outer surface of the shank of the bit;
- the second rib of the body and the second groove of the bit being complementary in configuration with the second groove nesting over at least a portion of the second rib for driving engagement;
- a second pocket formed in the shank within the second groove; and
- a second locking element for locking the bit with the body and having at least a defined portion thereof which is normally extended into the second pocket of the bit to further lock the bit with the chuck.

47. The chuck as set forth in claim 40, wherein the prescribed intermediate distance is a prescribed first distance, and which further comprises:
- the defined portion of the locking element having a forward end positioned at a normal location within the opening inward of the wall by a prescribed second distance from the axis of the body which is less than the prescribed first distance.

48. An assembly of a chuck and a bit mounted therein, which comprises:
- the chuck comprising:
  - a body having an opening therein formed along an axis thereof for receipt of the bit;
  - the opening formed with a wall having at least a portion thereof which is spaced from the axis of the body by a prescribed distance;
  - a locking element mounted for movement relative to the body for locking the bit within the opening of the body; and
  - the locking element having at least a defined portion thereof which is normally extendable from the wall into the opening of the body to a locking location within the opening generally intermediate the prescribed distance;
- the bit comprising:
  - a chuck-mountable shank formed along an axis thereof; and
  - a pocket formed in at least a portion of an outwardly facing surface of the shank at a prescribed radial distance from the axis of the shank;
- the axis of the shank being coincidental with the axis of the body of the chuck upon assembly of the bit within the opening of the body;
- the locking location and the pocket of the bit defining substantially the same location within the assembled chuck and bit;
- the defined portion of the locking element being located within the pocket of the bit at the locking location to thereby lock the bit with the chuck; and
- an actuator mounted movably on the body and coupled to the locking element where, upon selective movement of the actuator relative to the body, the locking element is moved away from the axis of the body to withdraw the defined portion of the locking element from within the pocket of the bit.

49. The assembly as set forth in claim 48, which further comprises:
- the actuator being normally biased to urge the defined portion of the locking element into the pocket of the bit.

50. An assembly which includes a chuck and a bit mounted in the chuck, which comprises:
- the chuck comprising:
  - a body having an opening therein formed along an axis thereof for receipt of the bit;
  - the opening formed with a wall having at least a portion thereof which is spaced from the axis of the body by a prescribed wall distance;
  - at least one protrusion having a prescribed height formed on the wall of the opening and extending toward the axis of the body to an inboard peak surface of the protrusion at an intermediate location within the opening which is spaced from the axis of the body by a prescribed intermediate distance;
  - the prescribed intermediate distance being less than the prescribed wall distance;
  - a locking element mounted for movement relative to the body for locking the bit within the opening of the body; and
  - the locking element having a defined portion thereof which is positioned normally at a location within the opening and which normally extends from the inboard peak surface of the at least one protrusion into the opening of the body to a location within the opening generally intermediate the inboard peak surface of the at least one protrusion and the axis of the body;

the bit comprising:
a chuck-mountable shank formed along an axis thereof; and
a pocket formed in at least a portion of an outwardly facing surface of the shank at a prescribed radial distance from the axis of the shank;

the bit being in assembly within the opening of the body of the chuck, wherein:
the axis of the shank is coincidental with the axis of the body of the chuck;
the pocket is adjacent the inboard peak surface of the at least one protrusion and is positioned at the locking location; and
the at least a defined portion of the locking element of the chuck being located within the pocket of the bit to thereby lock the bit with the chuck.

51. An assembly which includes a chuck and a bit mounted in the chuck, which comprises:

the chuck comprising:
a body having an opening therein formed along an axis thereof for receipt of the bit;
the opening formed with a wall having at least a portion thereof which is spaced from the axis of the body by a prescribed wall distance;
at least one rib having a prescribed configuration and formed on the wall of the opening and extending toward the axis of the body to an inboard peak surface of the at least one rib;
a locking element mounted for movement relative to the body for locking the bit within the opening of the body; and
the locking element having a defined portion thereof which is positioned normally within the opening and which normally extends from the inboard peak surface of the at least one rib into the opening of the body to a location within the opening generally intermediate the inboard peak surface of the at least one rib and the axis of the body;

the bit comprising:
a chuck-mountable shank formed along an axis thereof;
at least one groove formed in the shank in a configuration generally complementary to the prescribed configuration of the at least one rib of the chuck and facing radially outward from the axis of the shank; and
a pocket formed in the shank within at least a portion of the at least one groove at a prescribed radial distance from the axis of the shank;

the bit being in assembly within the opening of the body of the chuck, wherein:
the axis of the shank is coincidental with the axis of the body of the chuck;
the pocket is positioned at the locking location; and
the at least a defined portion of the locking element of the chuck is located within the pocket of the bit to thereby lock the bit with the chuck.

52. The assembly as set forth in claim 51, which further comprises:
the at least one groove formed with a base; and
the pocket being formed in the shank at the base of the at least one groove.

53. The assembly as set forth in claim 51, wherein the at least one rib is a first rib and the at least one groove is a first groove, which further comprises:

a second rib formed on the wall of the opening of the body and spaced angularly from the first rib;
a second groove formed in the shank and spaced angularly from the first groove; and
the second rib being located at least partially within the groove.

54. An assembly which includes a chuck and a bit mounted in the chuck, which comprises:

the chuck comprising:
a body having an opening therein formed along an axis thereof for receipt of the bit;
the opening formed with a wall having at least a portion thereof which is spaced from the axis of the body by a prescribed wall distance;
at least one rib having a prescribed configuration and formed on the wall of the opening and extending toward the axis of the body to an inboard peak surface of the at least one rib;
a locking element mounted for movement relative to the body for locking the bit within the opening of the body; and
the locking element having at least a defined portion thereof which is normally extendable from the inboard peak surface of the at least one rib into the opening of the body to a locking location within the opening;

the bit comprising:
a chuck-mountable shank formed along an axis thereof;
at least one groove formed in the shank in a configuration generally complementary to the prescribed configuration of the at least one rib of the chuck and facing radially outward from the axis of the shank; and
a pocket formed in the shank within at least a portion of the at least one groove at a prescribed radial distance from the axis of the shank;

the bit being in assembly within the opening of the body of the chuck, wherein:
the axis of the shank is coincidental with the axis of the body of the chuck;
the pocket is positioned at the locking location;
the at least a defined portion of the locking element of the chuck is located within the pocket of the bit to thereby lock the bit with the chuck;
the at least one rib formed with a prescribed height; and
the at least one groove formed with a prescribed groove-depth distance which is less than the prescribed height of the at least one rib.

55. The assembly as set forth in claim 54, which further comprises:
the at least one rib formed with spaced side walls which extend between the wall of the opening and the inboard peak surface of the at least one rib to define the prescribed height of the rib;
the at least one groove formed with side walls extending from a base of the at least one groove to an outer surface of the shank; and
the side walls of the at least one groove being in interfacing relation with only portions of the side walls of the at least one rib which extend from the inboard peak surface toward the wall of the opening.

56. The assembly as set forth in claim 54, wherein the bit is a first bit, the shank of the first bit is formed with a first-bit external transaxial dimension and the at least one groove of the first bit is a first-bit groove with the prescribed depth thereof being a prescribed first-bit groove-depth distance, which further comprises:

a second bit;
a chuck-mountable shank formed along an axis of the second bit with a second-bit external transaxial dimension which is different from the first-bit external transaxial dimension; and
a second-bit groove formed in the second bit with a prescribed second-bit groove-depth distance which is different from the prescribed first-bit groove-depth distance.

57. The assembly as set forth in claim 56, which further comprises:
the prescribed second-bit groove-depth distance is less than the prescribed height of the rib.

58. A chuck for receiving and supporting any one of a plurality of bits of a set, which comprises:
each bit being formed with a shank having an axis and a transaxial dimension; and
a shank of a first bit in the set having a different transaxial dimension from the shank of a second bit in the set;
the chuck comprising:
a body having an opening for alternatively receiving the shanks of the first and second bits in the set; and
at least one rib fixed to and extending from the body inwardly into the opening for alternatively driving the first and second bits in the set when the chuck is driven.

59. A fixed-jaw direct-insertion chuck, which comprises:
a body defining an opening having a predefined width;
a locking element operatively associated with the body and engageable with a bit shank when the bit shank is inserted into the opening; and
the locking element operable to releasably lock the bit with the body, where the bit has any one of a plurality of different shank diameters smaller than the width of the opening.

60. A bit for assembly with a chuck, which comprises:
a chuck-mountable shank formed along an axis thereof;
the shank formed with a free end;
at least one groove formed in the shank extending for a prescribed axial distance through and from the free end thereof to a closed inboard end of the groove;
the at least one groove being formed with at least one wall which is uniformly structured and uninterrupted from the free end of the shank to the closed inboard end of the groove;
a single pocket having an axial length less than the prescribed axial distance formed in the wall at a prescribed radial distance from the axis of the shank; and
the pocket having an axial length sufficient to allow axial movement of the bit relative to any element which may be located within the pocket.

61. A bit for assembly with a chuck, which comprises:
a chuck-mountable shank formed along an axis thereof;
the shank formed with a free end and a round cross-sectional configuration;
at least one groove formed in the shank extending for a prescribed axial distance through and from the free end thereof to a closed inboard end of the groove;
the at least one groove being formed with at least one wall which is uniformly structured and uninterrupted from the free end of the shank to the closed inboard end of the groove; and
a single pocket having an axial length less than the prescribed axial distance formed in the wall at a prescribed radial distance from the axis of the shank.

62. The bit as set forth in claim 61, which further comprises:
the at least one groove is a first groove;
a second groove and a third groove formed in the bit; and
the pocket being formed in at least one of the first, second and third grooves.

63. A chuck for receiving and supporting a bit, which comprises:
a body having an opening therein formed along an axis thereof for receipt of the bit;
the opening formed with a wall and having an open end and a floor end spaced axially from the open end;
at least two ribs formed on and extending inward from the wall of the opening of the body and between the open end and the floor end of the opening;
the at least two ribs being equally angularly spaced about the opening;
each of the at least two ribs formed with a surface which faces the axis of the body and is spaced from the axis; and
a locking element for locking the bit with the body and having at least a defined portion thereof which is normally extendable into the opening of the body from the surface of the at least one rib at a prescribed distance from the axis of the body.

64. A chuck for receiving and supporting a bit, which comprises:
a body having an opening therein formed along an axis thereof for receipt of the bit;
the opening formed with a wall and having an open end and a floor end spaced axially from the open end;
at least one rib formed on and extending inward from the wall of the opening of the body and between the open end and the floor end of the opening;
the at least one rib formed with a flat surface which faces the axis of the body and is spaced from the axis; and
a locking element for locking the bit with the body and having at least a defined portion thereof which is normally extendable into the opening of the body from the surface of the at least one rib at a prescribed distance from the axis of the body.

65. The chuck as set forth in claim 64, which further comprises:
the surface of the at least one rib being rounded at least in a portion thereof which faces the axis of the body.

66. A chuck for receiving and supporting a bit, which comprises:
a body having an opening therein formed along an axis thereof for receipt of the bit;
the opening formed with a flat wall and having an open end and a floor end spaced axially from the open end;
at least one rib formed on and extending inward from the flat wall of the opening of the body and between the open end and the floor end of the opening;
the at least one rib formed with a surface which faces the axis of the body and is spaced from the axis; and
a locking element for locking the bit with the body and having at least a defined portion thereof which is normally extendable into the opening of the body from the surface of the at least one rib at a prescribed distance from the axis of the body.

67. The chuck as set forth in claim 66, wherein the wall of the opening is convex and the at least one rib extends from the convex wall.

68. The chuck as set forth in claim 66, wherein the wall of the opening is undulated and the at least one rib extends from the undulated wall.

69. A chuck for receiving and supporting a bit, which comprises:
   a body having an opening therein formed along an axis thereof for receipt of the bit;
   the opening formed with a wall and having an open end and a floor end spaced axially from the open end;
   at least one rib formed on and extending inward from the wall of the opening of the body and between the open end and the floor end of the opening;
   the at least one rib formed with a surface which faces the axis of the body and is spaced from the axis;
   a passage formed in the body and extending through the at least one rib at the surface of the rib and in communication with the opening of the body;
   a locking element for locking the bit with the body and having at least a first portion thereof which is movably located within the passage and a second portion thereof which is normally extendable into the opening of the body from the surface of the at least one rib with a forward end of the second portion locatable at a prescribed distance from the axis of the body; and
   the passage and at least the first portion of the locking element being formed with complementary cross-sectional structure.

70. The chuck as set forth in claim 69, wherein the complementary cross-sectional structure of the passage and the first portion of the locking element is circular.

71. The chuck as set forth in claim 69, wherein the complementary cross-sectional structure of the passage and the first portion of the locking element is square.

72. The chuck as set forth in claim 69, wherein the complementary cross-sectional structure of the passage and the first portion of the locking element is rectangular.

73. The chuck as set forth in claim 69, wherein the forward end of the second portion of the locking element is flat.

74. The chuck as set forth in claim 69, wherein the forward end of the second portion of the locking element is rounded.

75. The chuck as set forth in claim 69, wherein the forward end of the second portion of the locking element is pointed.

76. An assembly of a chuck and a set of bits, which comprises:
   a set of bits comprising:
      a first bit formed with a shank having a free end, a shank axis and a first transaxial dimension;
      a groove formed in the shank of the first bit and extending through the free end thereof;
      a second bit formed with a shank having a free end, a shank axis and a second transaxial dimension;
      a groove formed in the shank of the second bit and extending through the free end thereof;
   a chuck comprising:
      a body having an opening for receiving the bit shank, the opening defining an axis of the chuck; and
      at least one jaw extending from the body a predetermined distance toward the chuck axis for alternative driving engagement in the grooves of the first bit and the second bit.

77. An assembly, which comprises:
   a chuck comprising:
      a body forming an opening with a longitudinal axis;
      at least one rib extending from the body into the opening toward the longitudinal axis a first fixed distance; and
      a locking element in the body extending through the at least one rib toward the longitudinal axis of the chuck a second fixed distance;
   a set of bits comprising:
      each bit being formed with a shank having a free end, a shank axis and a transaxial dimension;
      a shank of a first bit in the set having a different transaxial dimension from a shank of a second bit in the set;
      a driving surface of the first bit in driving engagement with the at least one rib of the chuck for driving the first bit about its shank axis;
      a first locking surface of the first bit in engagement with the locking element to lock the first bit against axial movement relative to the opening;
      a driving surface of the second bit alternatively in driving engagement with the at least one rib of the chuck for driving the second bit about its shank axis; and
      a second locking surface of the second bit alternatively in engagement with the locking element to lock the second bit against axial movement relative to the opening.

78. A method of mounting alternatively bits of a set in a chuck, which comprises the steps of:
   providing a set of bits wherein:
      each bit being formed with a shank having a free end, a shank axis and a transaxial dimension;
      the shank of a first bit in the set having a different transaxial dimension from the shank of a second bit in the set;
      a groove formed in the shank of the first bit in the set and extending through the free end;
      a pocket formed in the groove of the first bit shank at a prescribed radial distance from the axis of the shank;
   providing a chuck comprising a body having an opening for alternatively receiving the shanks of the bits in the set, the opening defining an axis of the chuck;
   inserting alternately the first bit shank and the second bit shank in the chuck opening;
   drivingly engaging in the groove of the first bit a rib of the chuck, the rib projecting a predetermined distance toward the chuck axis; and
   drivingly engaging a surface of the second bit and the rib of the chuck, the rib projecting the same predetermined distance toward the chuck axis when the first and second bits are alternatively inserted in the chuck.

79. The method as set forth in claim 78, which further comprises the step of:
   inserting the locking element of the chuck in the pocket to lock the first bit against axial movement in the chuck opening.

80. The method as set forth in claim 78, wherein:
   for drivingly engaging the second bit and the chuck, the second bit has a groove formed in the shank, extending through the free end and containing the surface of the second bit shank drivingly engaged with the rib of the chuck.

81. The method as set forth in claim 80, wherein:
   for forming the driving engagement between the chuck and the first and second bits, the chuck has three ribs and the first and second bits each have three grooves for alternately receiving, respectively, the three ribs of the chuck.

82. A method for mounting alternatively bits of a set in a chuck, which comprises the steps of:

providing a chuck comprising:
  a body forming an opening with a longitudinal axis;
  at least one rib extending from the body into the opening toward the longitudinal axis a first fixed distance; and
  a locking element in the body extending through the at least one rib toward the longitudinal axis of the chuck a second fixed distance;

providing a set of bits wherein:
  each bit being formed with a shank having a free end, a shank axis and a transaxial dimension;
  a shank of a first bit in the set having a different transaxial dimension from a shank of a second bit in the set;

inserting the first bit of the set in the chuck;

drivingly engaging the at least one rib with a first driving surface of the first bit for driving the first bit about its shank axis;

engaging the locking element with a first locking surface of the first bit to lock the first bit against axial movement relative to the opening;

removing the first bit from the chuck;

alternatively inserting the second bit into the chuck opening;

drivingly engaging the at least one rib with a second driving surface of the second bit about its shank axis; and engaging the locking element with a second locking surface of the second bit to lock the second bit against axial movement relative to the chuck opening.

83. The method as set forth in claim 82, wherein the first driving surface of the first bit is a groove formed longitudinally in the first bit.

84. The method as set forth in claim 82, wherein the first locking surface of the first bit is a pocket formed in a groove formed longitudinally in the first bit.

85. The method as set forth in claim 82, wherein the second driving surface of the second bit is a groove formed longitudinally in the second bit.

86. The method as set forth in claim 82, wherein the first locking surface of the first bit is a pocket formed in a groove formed longitudinally in the first bit.

87. The method as set forth in claim 82, wherein the chuck is formed with three ribs extending from the body into the opening and each of the first bit and the second bit is formed with three grooves for providing the driving surfaces for drivingly engaging a respective one of the three ribs.

88. The method as set forth in claim 82, wherein the body is formed with a passage within which the locking element is movably mounted, which further comprises the step of:

retracting the locking element within the passage during the inserting of the first bit and second bit into the chuck, and the removing of the first bit from the chuck.

89. A method of assembling a chuck, which comprises the steps of:

providing a body having an axis and an external surface extending between a forward end and a rearward end, with a travel-limit stop extending outward from the external surface at a location intermediate the forward and rearward ends;

providing an actuator having an opening structured for positioning over the external surface of the body for sliding axial movement between the forward end and the travel-limit stop of the body;

providing a nose piece having an opening structured for press fitting the nose piece onto the external surface of the body at the forward end of the body;

mounting the actuator onto the external surface of the body between the forward end and the travel-limit stop of the body; and mounting the nosepiece by press fit onto the external surface of the body at the forward end thereof to capture the actuator for sliding axial movement between the nose piece and the travel-limit stop.

90. A bit for assembly with a chuck, which comprises:

a chuck-mountable shank formed along an axis thereof;

the shank formed with a free end and a non-round cross-sectional configuration;

at least one groove formed in the shank extending for a prescribed axial distance through and from the free end thereof to a closed inboard end of the groove;

the at least one groove being formed with at least one wall having surface portions which are uniformly structured and uninterrupted from the free end of the shank to the closed inboard end of the groove; and a single pocket having an axial length less than the prescribed axial distance formed in the wall at a prescribed radial distance from the axis of the shank.

* * * * *